United States Patent

[11] 3,601,805

[72] Inventor Richard K. Snook
Bridgeton, Mo.

[21] Appl. No 692,975
[22] Filed Dec. 22, 1967
[45] Patented Aug. 24, 1971
[73] Assignee Research Systems Corporation
Bridgetown, Mo.

[54] CREDIT CARD VERIFIER APPARATUS
46 Claims, 23 Drawing Figs.

[52] U.S. Cl. .......... 340/149 R, 235/61.11 E, 235/61.7 B, 340/149 A
[51] Int. Cl. .......... H04q 9/00
[50] Field of Search .......... 340/149, 149 A, 152, 146.2; 235/61.7, 61.11 E, 61.7 B

[56] References Cited

UNITED STATES PATENTS

| | | | |
|---|---|---|---|
| 3,401,830 | 9/1968 | Mathews | 340/149 UX |
| 3,308,238 | 3/1967 | Brothman et al. | 340/152 X |
| 2,785,388 | 3/1957 | McWhirter et al. | 340/149 A |
| 3,159,818 | 12/1964 | Scantlin | 340/152 X |
| 3,184,714 | 5/1965 | Brown et al | 340/149 A |
| 3,344,258 | 9/1967 | Michels | 340/149 A |
| 3,394,246 | 7/1968 | Goldman | 340/149 A |
| 3,465,289 | 9/1969 | Klein | 340/149 |
| 3,465,299 | 9/1969 | Schellenberg | 340/146.2 X |

*Primary Examiner*—Donald J. Yusko
*Attorney*—Robert J. Schaap

ABSTRACT: An apparatus for electronically comparing customer credit card numbers with a stored list of invalid credit card numbers and providing an indication whenever a favorable comparison occurs. A drum removably holds a magnetic multitrack tape with invalid card numbers recorded thereon in binary coded decimal form. A reading head is shifted from track to track on the multitrack tape and senses the signals on the tape. A logic circuitry is provided for comparing the card number with the readout of the drum. The reading head detects a logical pulse and this in turn allows a subsequently detected synchronizing pulse detected by a synchronous head to pass and clock a transfer flip-flop circuit. The read credit card number is transferred to a shift register and is compared serially bit-by-bit with the output of the transfer flip-flop circuit in a half adder. A recirculating output from the shift register is also provided for returning signals to the input thereof. A bad card flip-flop receives an input whenever there is no sum output from the half adder for the series of digits.

INVENTOR
RICHARD K. SNOOK
BY Robert J. Schaap
ATTORNEY

INVENTOR
RICHARD K. SNOOK
BY
Robert J. Schaap
ATTORNEY

INVENTOR
RICHARD K. SNOOK
BY
Robert J. Schaap
ATTORNEY

INVENTOR
RICHARD K. SNOOK
BY
Robert J. Schaap
ATTORNEY

INVENTOR
RICHARD K. SNOOK
BY
Robert J. Schaap
ATTORNEY

INVENTOR
RICHARD K. SNOOK

BY *Robert J. Schaap*

ATTORNEY

INVENTOR
RICHARD K. SNOOK
BY
Robert J. Schaap
ATTORNEY

INVENTOR
RICHARD K. SNOOK
BY
Robert J. Schaap
ATTORNEY

INVENTOR
RICHARD K. SNOOK
BY
Robert J. Schaap
ATTORNEY

INVENTOR
RICHARD K. SNOOK
BY Robert J. Schaap
ATTORNEY

CREDIT CARD VERIFIER APPARATUS

This invention relates in general to certain new and useful improvements in credit card verifying apparatus, and more particularly, to an apparatus which is capable of comparing a given credit card number with a stored list of invalid card numbers and providing an advisory signal upon comparison thereof.

In our present day economy, purchases of goods and services on a credit basis has become a commonly accepted manner of doing business and accounts for a large part of the gross national product. Almost every available commodity can be purchased on a credit transaction. The number of companies and firms which now employ credit cards as a means of recording such transactions has significantly increased in the past few years. While many of these companies employ rigorous investigation procedures on each of the applicants for credit cards, there is nevertheless a number of credit cards issued to parties who are bad credit risks. Notwithstanding the initial issuance of the card based on investigations, many people may later be classified as poor or bad credit risks. This problem is even more acute in the case of stolen credit cards where the possessor thereof may purchase large quantities of goods and services to the financial detriment of the equitable card owner or to the company issuing the card. However, attempts to discover and repossess the invalid credit card are not only difficult and costly, but oftentimes futile.

Accordingly, many of the companies which issue credit cards have had to resort to the frequent and periodic issuance of lists of bad credit card numbers. In the case of oil companies whose customers transact a great portion of the total business on a credit basis, the bad number list often reaches several thousand numbers. It is, therefore, incumbent upon the retailer to check each customer credit card against the list of bad numbers. To make a careful comparison of the customer card with the list of bad card numbers may take several minutes and is always subject to the observational error on the part of the party making the comparison. Due to the inefficiency of this type of comparison and cost of time involved, many establishments will only make a cursory comparison at best. In addition, established comparison practice often falls into a state of disuse.

Many of the establishments issuing the goods or services on a credit transaction will not benefit themselves of the service of the bad card list due to the possible alienation of the customer. Many customers feel that the necessity of checking their credit card implies a lack of credibility to the customer. Furthermore, many customers become irritated at the delay while the investigation is being made. As a result of these problems, many retail establishments deem that it is feasible to forego the desirability of checking the credit card and suffering the risk. Notwithstanding, the losses incurred by the retail establishment and in many cases the company issuing the credit cards are very significant.

In order to obviate this problem, there has been a recent introduction in the market of a number of commercially available apparatus such as that described in U.S. Pat. No. 3,184,714 for electronically comparing customer credit cards with a stored list of invalid card numbers. However, in each of the electronically operable commercially available devices, the electronic components are oversophisticated and the costs of purchasing such devices are prohibitive. In other types of devices such as that described in U.S. Pat. No. 3,315,230, a large number of mechanical components are employed which makes the device excessively large. In addition, devices of this type usually have a low dynamic range and a long response time.

In all of the presently available devices the periodic removal and replacement of the stored list of invalid credit cards involves an intricate and time consuming replacement procedure. Furthermore, unless extreme care is exercised in changing the stored list of invalid credit card numbers, the intricate mechanisms of the device can be misaligned and knocked out of adjustment. In those devices which employ optical films with the stored list optically recorded thereon, any contact of the film with a foreign surface will materially interfere with the correct scanning of the numbers on the list.

OBJECTS

It is, therefore, the primary object of the present invention to provide a credit card verifying apparatus which is capable of comparing customer credit card numbers with a stored list of invalid credit card numbers and providing an indication whenever a favorable comparison occurs.

It is a further object of the present invention to provide a credit card verifying apparatus of the type stated which has a high dynamic range and short response time.

It is another object of the present invention to provide an apparatus of the type stated which involves a minimum number of expensive mechanical and electrical components thereby lending itself to construction at a low unit cost on a mass-production basis.

It is an additional object of the present invention to provide an apparatus of the type stated which is relatively simple, but highly efficient and reliable in its operation.

It is also an object of the present invention to provide a method of rapidly comparing a customer credit card number with a stored list of invalid credit card numbers in a binary coded decimal form.

It is another salient object of the present invention to provide an apparatus of the type stated which can be manufactured in the form of a small compact unit and which is rigid in its construction.

It is yet another object of the present invention to provide an apparatus of the type stated, which is designed so that the invalid credit card list can be updated without necessitating the disassembly of the apparatus and in such manner that it will not present any danger of damage to the internal components of the apparatus.

With the above and other objects in view, my invention resides in the novel features of form, construction, arrangement and combination of parts presently described and pointed out in the claims.

FIGURES

In the accompanying drawings (10 sheets):

DEFINITIONS

Figure 1:
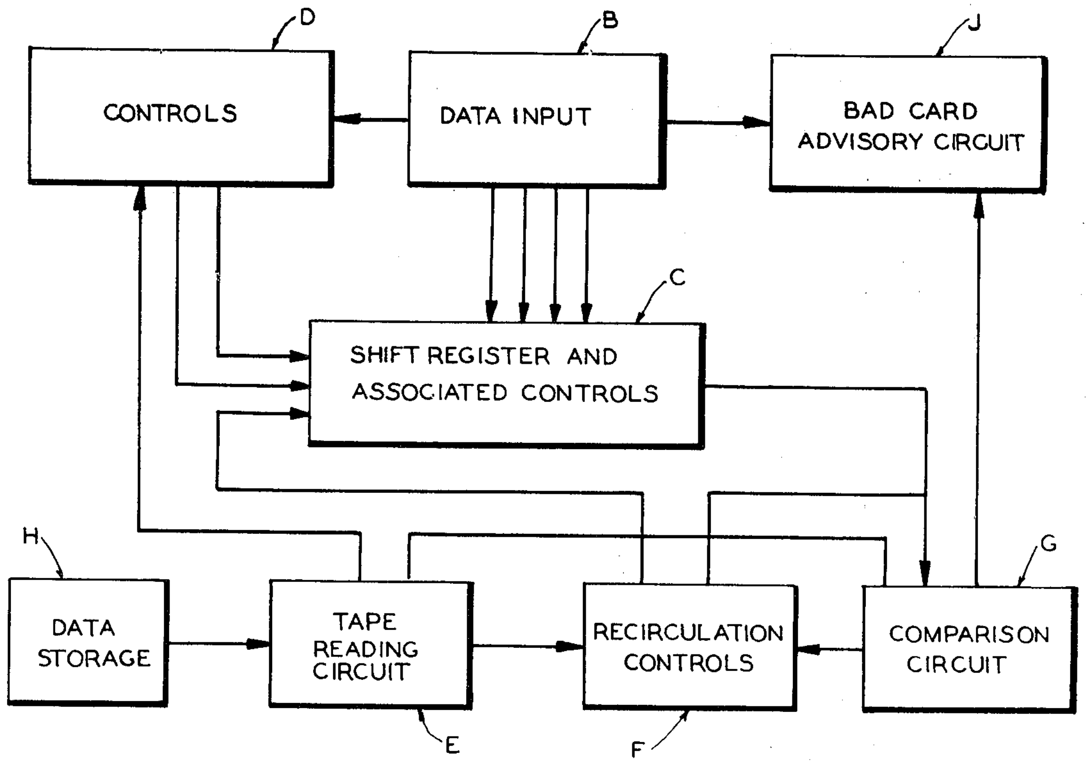
FIG. 1 is a schematic illustration of a functional block diagram showing the major components forming part of the credit card verifying apparatus of the present invention.

The recent advances in the field of cybernetics and more particularly in the field of data processing has created a condition of multiple uses of terms which has led to some confusion. In view of the fact that there is no accurate standardization of terms, the following definitions are set forth for purposes of clarity. It should be recognized that these definitions are only exemplary and, therefore, nonlimiting.

As used herein:

*Character*—a conventional or nonconventional mark, symbol, number or digit such as a decimal digit or letter of the alphabet or similar indicia.

*Word*—one or more characters such as a group of decimal digits to form a number, as for example, 10 decimal digits may represent one word.

*Bit*—a binary decimal or binary coded decimal or similar digital or analog element which is generated through conversion of a character to another type of character system or language; as for example, for bits generated from a decimal digit.

*Set*—the number of bits required to represent one character, as for example, the four bits generated to represent one decimal digit would constitute a set.

*Digital Recorded Data*—data recorded by techniques commonly used in digital computers as a pulse recorded signal, generally using two discrete flux levels.

*Analog Recorded Data*—data recorded by techniques such that flux levels are an analog of current or voltage signals.

*Reading*—the process of discerning and acquiring data from a member (the term "reading" is generally applied in digital arts and the term "reproducing" is generally applied in analog arts, but have synonomous meanings herein).

*Recording*—the process of registering data in some temporary, permanent or semipermanent form (the term "recording" is generally applied in analog arts and the term "writing" is generally applied in digital arts, but have synonomous meanings herein).

The remaining terms used herein are deemed to have their commonly accepted art recognized meanings.

GENERAL DESCRIPTION

The device of the present invention includes eight basic components which are a memory storage unit for retaining the stored list of invalid credit card numbers; a keyboard for entering the card number to be compared with the numbers on the stored list; a control system for operating the various mechanical and electrical components to be hereinafter described in detail; a tape reader including a head and amplifier system for reading the list of card numbers on the stored list and providing proper timing signals; a shift register and associated controlling mechanism for accepting the number entered into the device from the keyboard; a recirculation control system for recirculating the entered number in the shift register during the comparison function; adders and comparitors for comparing the entered card number with the list of invalid card numbers; and a bad card energization circuit for providing advisory signals upon detection of a bad card number. A parity circuit may be optionally provided with the device.

The keyboard includes 10 decimal digit labeled keys one through nine and zero connected to a diode matrix for converting the decimal input to a four bit binary coded decimal system. The apparatus of the present invention preferably operates on a 1—2—4—8 bit code. The diode matrix includes a series of diodes for conversion of the input and four bit lines which are connected to a two section shift register. The diode matrix also includes an enabling pulse line which is connected to a 4-bit pulse counter.

The shift register includes a jam register containing four flip-flops and a recirculating register. The four bit lines are respectively connected to each of the four flip-flops in the jam register. A shift bus from the 4-bit counter carries a trigger signal to the input of each of the four flip-flops. The information which is generated in the form of four individual bit pulses is transferred to and jammed into the four flip-flops. The trigger signals or shift signals metered by the four-bit counter processes the data out of the jam register and into the recirculating register. Differentiating capacitors are interposed in each of the bit lines. A one-shot is provided to hold the shift pulses for a time sufficient to insure setting of the jam register.

The 4-bit counter includes a modulo four counter which serves as an off-on switch. This counter is connected to an AND gate which receives a series of timing pulses from a synchronizing gate. The AND gate is connected to a first counter which is, in turn, connected to a second counter. Both counters are connected to a summing gate and to a three signal summing gate. The output of the summing gate is connected to a reset gate which is in turn connected to the modulo four counter. The three signal summing gate is also connected to the modulo four counter. In essence, the 4-bit counter counts the number of shift pulses and meters four shift pulses to shift the four bits of information located in the jam register into the recirculating register.

Shift pulses are received at a shift gate to shift the data jammed into the jam register into the recirculating register through a pair of load gates. The shift pulses will be metered four at a time by the 4-bit counter as indicated above. This operation will be repeated until all of the information on the credit card has been entered into the apparatus. During the jamming of the information in the jam register, a pair of recirculating gates on the output of the recirculating register will be closed.

The apparatus also includes a motor which is energized by a start switch and a drum which is rotatable thereby. A removable magnetic tape is connected to the drum by means of pins protruding from the drum. The drum is mounted in the apparatus housing for easy and convenient changing of the drum tape. A head escapement mechanism is also employed and carries a sync head which is normally disposed in reading position against the first or sync track of the tape. The remaining tracks of the tape all contain data pulses and logic pulses. A logic pulse is inserted between each 40 bits of information and serves as a spacer. The head escapement mechanism is capable of shifting the data head into and out of engagement or reading position against each of the data tracks on the tape. Furthermore, the head escapement mechanism is capable of shifting the head from track to track after each complete revolution of the drum. The drum enables generation of a cam pulse by means of a cam on the drum surface and a limit switch actuable thereby. The cam pulse will actuate the head escapement mechanism to shift the data head to the next adjacent track.

Each of the heads is connected to an amplification system and the sync head is also connected to a level normalizing circuit. This normalizing circuit is then connected to a head position gate. The head position gate is connected to a sync pulse gate and to a track shift flip-flop. The sync pulse gate is connected to the shift gate for feeding shift pulses at synchronization rate to the shift register. The sync pulse gate is also connected to a number of other components of the apparatus hereinafter described to insure complete operation at sync pulse time.

The data head is connected through the amplificaton system to the track shift flip-flop and to the sync gate. The data from the data head is transferred to a filter for assorting the signals read into a "one" pulse, a "zero" pulse and a logic pulse. The logic pulse is transferred to the track shift flip-flop. When the drum is rotated it will generate a cam pulse which will enable the track shift flip-flop which will, in turn, enable the head escapement mechanism to shift the data head to the next adjacent track.

Each word recorded on the tape is spaced by a logic pulse and a logic pulse precedes the first word. The logic pulse is transferred to a logic pulse gate which is also connected to the source of sync pulses to operate a latching circuit. Actuation of the head escapement mechanism will not take place and transference of information from the logic pulse gate will be prevented until the start key has been actuated.

The "one" and "zero" outputs of the filter is transferred to an optionally provided read error circuit. This circuit employs an exclusive OR gate to determine if an error occurred in the reading process. This circuit is connected to an error flip-flop for actuating the same in the event of a reading error. This latter flip-flop is connected to an error light which will be energized upon actuation of the error flip-flop. The error flip-flop can be reset by the start switch. The "one" signal output of the filter is connected to a half adder for comparison with recirculated information from the shift register. The comparison is performed serially on a bit-by-bit basis.

The half adder is connected to a memory flip-flop which is, in turn, connected to a bad card flip-flop. The memory flip-flop will keep track of all of the actual comparisons. After a complete reading of all of the information on the tape between two logic pulses and comparing the same with that in the shift register, the bad card flip-flop will be actuated if a complete equality of informaton was determined. As indicated, all comparisons of the informational bits will take place serially and on a bit-to-bit basis, and evaluation of words is performed at logic pulse time. In other words, an evaluation is only performed after all of the bits between two logic pulses have been serially compared with the bits on the tape. In the event that a complete equality of bits was detected, the bad card flip-flop will energize a bad card light. A latching circuit is provided to maintain energization of the bad card light until resetting of the entire apparatus. A clear switch is provided for resetting some of the components in the apparatus prior to the commencement of each use of the apparatus. In the enent that the comparison did not detect a complete equality, then the bad card light will not be energized.

A parity circuit may be provided with the apparatus for determining if any informational bit in the shift register was lost during the process. This circuit will count the number of bits which are recirculating in the recirculating register. During the recirculation process, the load gates will be closed and the recirculation gates will be opened. A parity gate is also interposed between the half adder and the memory flip-flop, in the event that a parity circuit is employed. In essence, the parity circuit examines for odd or even numbers of pulses at a rate of four at a time. An arithmetic addition is performed to the least significant digit so that the sum is either odd or even. This sum is then compared to the number of bits in the recirculating register.

A modified form of credit card verifier is also provided and which is capable of automatically reading the bar code on a credit card. A card reader comprising a card retaining plate pulls the credit card and an invoice slip disposed thereon under a printing roller, the imprint the information contained on the card onto the invoice slip. Thereafter, a light source is energized and directs a beam of light through a prism onto the bar code. The bar code which is in the form of a two out of five code is read by a series of photocells and the information transferred to a conversion matrix. The two out of five code is converted to a 4-bit BCD code for transference to the shift register. A pair of one-shots are provided for insuring that the credit card is properly aligned before the actual reading process is initiated. A slightly modified form of 4-bit counter is employed which enables the elimination of capacitors used at the set input of each of the jam register flip-flops.

The present invention also provides a modified form of shift register which includes a recirculating register substantially similar to the previously described recirculating register and an AND gate matrix in place of the jam register. The AND gate matrix includes an AND gate for each bit line and each AND gate is connected to an OR gate, the latter being connected to the recirculating register through a pair of load gates. This shift register operates on a temporal relation whereas the shift registering using a jam register operates on a position relation.

An apparatus employing a pulse recorded tape as opposed to FSRK recording is also provided. This apparatus employs an input of NRZM (nonreturn to zero mark) data and employs a tape having a similar data form recorded thereon. The tape also includes a sync track and a plurality of tracks with the data and logic signals. However, the tape is designed with an inherent redundancy. The data is recorded simultaneously and read simultaneously with two adjacent heads on two adjacent racks bearing the same information. A circuit is provided to ascertain whether or not any information was lost or unread in the reading process. If there is not a detected redundancy in the information read from two adjacent tracks then the error flip-flop is actuated, and this will energize the error light. If the redundancy is detected, then the information is transferred to the half adder for comparison with the information recirculating in the recirculating register. The remainder of the apparatus is substantially similar to the previously described apparatus.

The present invention also provides a verifier apparatus which employs a drum escapement mechanism in place of the head escapement mechanism. The drum escapement mechanism comprises a shaft for shiftably supporting the drum. A plurality of escapement cams are mounted on the shaft and are intermittently engageable by a pair of escapement rollers to cause sequential shifting movement of the shaft when the escapement rollers are disengaged from the cams. The escapement rollers are mounted on pivotal arms which also carry cam followers. When the cam followers are shifted through the action of a cam, the escapement rollers will become disengaged from the escapement cams. Each of the positions is so located so that the drum is positioned to align a stationary data head with the next adjacent track on the drum surface. A resetting mechanism is also provided for shifting the drum back to its initial starting position at the end of each cycle.

An apparatus and method is provided for recording either the analog or digital signals on the magnetic tape or drum. A conventional computer having a data storage with the invalid credit card information stored therein is operatively connected to or interfaced with a buffer memory. The information in the computer is transferred in parallel to the buffer memory which is, in turn, connected to a shift register. The output of the shift register is connected to a conventional tape recorder. A counter will provide the timing signals or sync pulses for the clock or sync track. The counter is also responsible for introducing the logic pulse on the tracks for separation of the words. As the logic pulse is being recorded the buffer memory transfers the next group of data into the shift register. After a word is read in the buffer memory, it is recycled and the address thereof is recorded.

When recording analog information, a number of shift registers may be employed. In addition, a level shifter would assign a DC voltage to each of the three states, logic, "zero" and "one"; and FM electronics would assign a frequency to the corresponding voltage levels.

DETAILED DESCRIPTION

Referring now in more detail and by reference characters to the drawings, which illustrate practical embodiments of the present invention, A designates a credit card verifying apparatus, hereinafter referred to as the "verifier." The verifier A is provided with eight major units or systems which are schematically illustrated in FIG. 1 and include a data input B. The data input B may be in the form of a keyboard more fully described in detail hereinafter, or in the form of an automatic card reader, also more fully described in detail. The verifier A also includes a shift register C which is connected to the data input B by means of four bit lines. The shift register retains the input data in binary coded decimal form for comparison with stored information.

A control system D is connected to the data input B through an inhibit pulse line and is connected to the shift register C through a pair of timing inputs. A tape reader including a heads and amplifier system E is connected to the controls D for providing timing signals thereto and is also connected to a recirculation control system F, the latter, in turn, being connected to the shift register C. The recirculation control system F is designed to shift the data in the register and recirculate the same during the comparison with the stored data. The recirculation control system F is also connected to the output of the shift register C in the manner as illustrated in FIG. 1. The output of the shift register C is, in turn, connected to a comparison circuit G which also receives an input from the heads and amplifier system B. The comparison circuit G also has an output connected to the recirculation control system F.

The heads and amplifier system B is also connected to a data storage system H in the form of a drum which accepts a removable tape having the list of invalid numbers stored thereon. The heads and amplifiers system E picks up the data on the tape nd transmits the same to the recirculation control system F and the comparison circuit G. The output of the comparison circuit G is connected to an indicator system J capable of providing an advisory signal, thereby informing the attendant whether the input number compared with an invalid number on the stored list. A parity circuit, not illustrated in FIG. 1, may also be provided for detecting internal error in the verifier A.

Each of the aforementioned units or systems is more fully illustrated in the succeeding drawings and described in terms of their internal components hereinafter.

Figure 2:
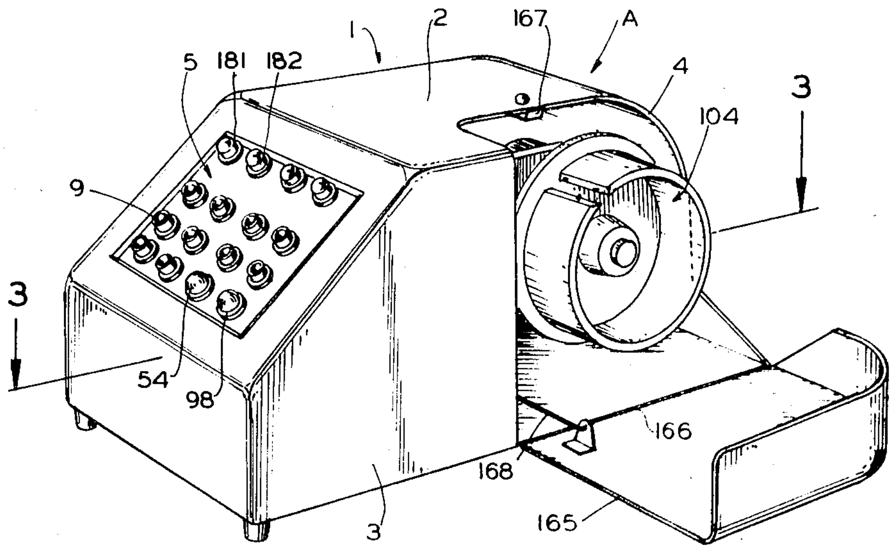
FIG. 2 is a perspective view of the credit card verifying apparatus of the present invention.

The verifier A generally comprises an outer housing 1 having a top wall 2, a pair of opposed sidewalls 3, and a rear wall 4 which integrally merges into the top wall 2. The front wall of the housing is partially inclined and serves as a control panel 5 in the manner as illustrated in FIG. 2. The housing 1 may be fabricated from sheet metal such as steel or aluminum and may be of welded or brazed construction, or it may be unitarily cast. In addition, the housing 1 may be formed of any suitable plastic or synthetic resin material. The housing 1 is also mounted on a baseplate 6 and retained thereon by means of spotwelds or other suitable fastening means 7.

Rigidly mounted on the control panel 5 is a keyboard 8 having ten depressable keys or input buttons 9 which are labeled one through nine and zero. The data input B, illustrated in FIG. 1 comprises the keyboard 8. The keyboard 8 is operated in a manner similar to that of an adding machine and can be conveniently and simply operated by an attendant or user of the apparatus A. The numbers appearing on the keys 9 are the conventional digits to the base 10, and the number appearing on a credit card is the number that the operator enters into the apparatus through the keyboard 8.

The apparatus of the present invention operates on the binary coded decimal system and converts each decimal digit into a 4-bit binary coded decimal through a number converter 10. The converter 10 includes a diode matrix 11 forming part of the keyboard 8. In the present invention, the binary coded decimal system is a system of number representation in which each decimal digit is represented by a group of binary digits and usually refers to the four position binary code 0000 to 1001 (decimal 1 to 9). Each decimal digit is therefore represented by four bits. In the preferred method of the present invention, a 1, 2, 4, 8 bit code is employed. However, other 4-bit codes, such as the gray code could also be employed as well. Each of the keys 9 is spring biased to the unactuated position so that a simple momentary closure of each of the keys will generate a 4-bit pulse.

Figure 8:
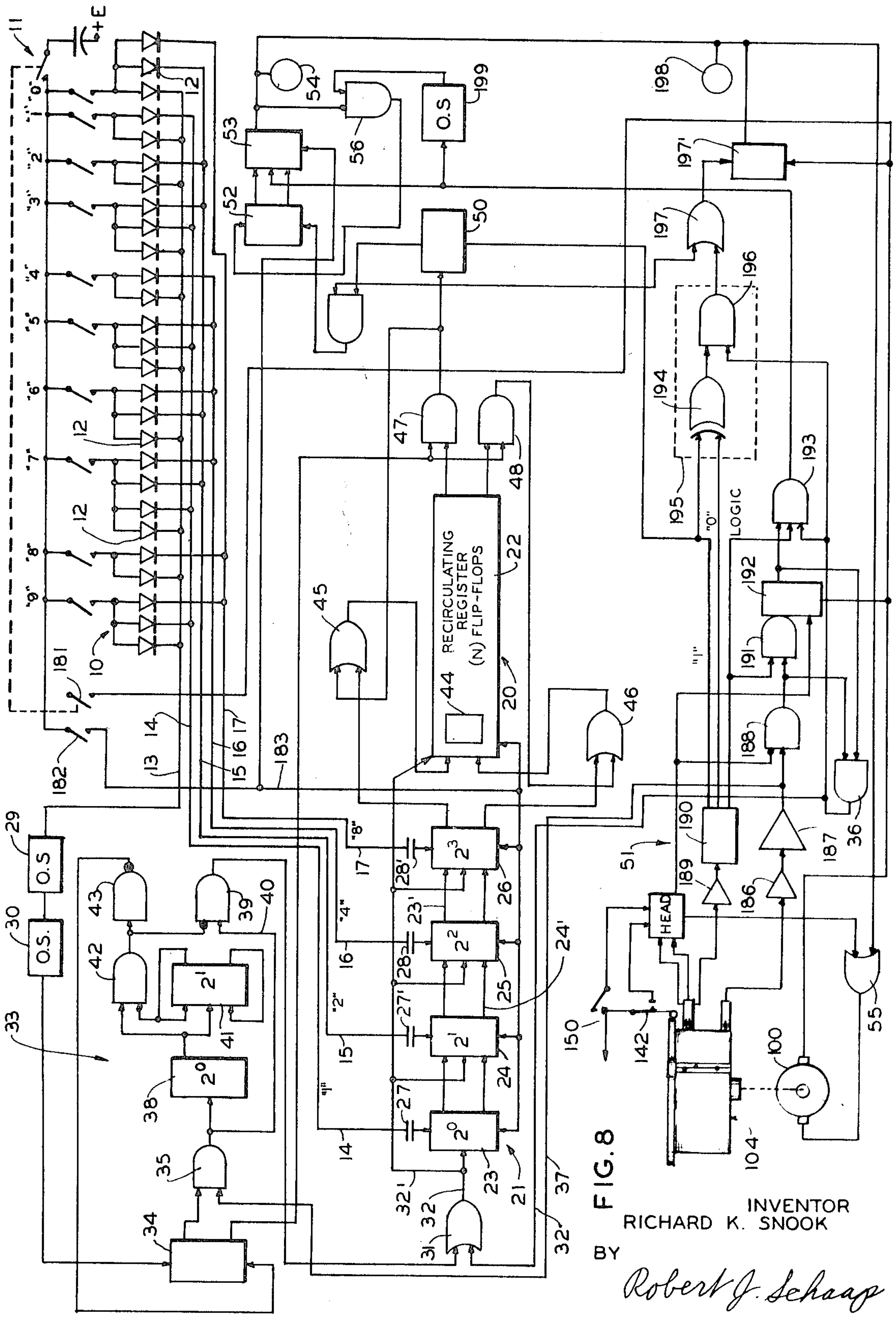
FIG. 8 is a schematic logic diagram illustrating the electrical circuitry forming part of the apparatus of the present invention.

The diode matrix 11 includes a series of diodes 12 for converting the decimal digits to the 4-bit code. The binary coded decimal equivalent of the numeral 10 actually represents the decimal digit 0 and three diodes 12 are associated with the key labeled 0. The decimal digit 0 in this system can be represented by 1010 in order to eliminate any ambiguity which might arise in the case where no bits are present. The diode 12 is connected to an enabling pulse line 13. The keyboard 8 also includes 4-bit lines 14, 15, 16 and 17 and which are also "1," "2," "4," and "8," respectively. The bit line 14 labeled "1" actually represents the binary coded decimal $2^0$; the bit line 15 labeled "2" represents the binary coded decimal digit $2^1$; the bit line 16 labeled "4" represents the binary coded decimal digit $2^2$; and the bit line 17 labeled "8" represents the binary coded decimal digit $2^3$. The "1" key 9 has a pair of diodes 12, one of which is connected to the enabling pulse line 13 and one of which is connected to the "1" line 14. The "2" key 9 has a pair of diodes 12, one of which is connected to the enabling pulse line 13 and one of which is connected to the "2" line 15. The "3" key has three diodes 12, one of which is connected to the enabling pulse line 13, one of which is connected to the "1" line 14 and the last of which is connected to the "2" line 15. The remaining keys 9 are connected through the diode matrix 11 to the bit lines 14, 15, 16 and 17 in the manner as illustrated in FIG. 8. It should be noted that each of the keys 9 has one diode 12 connected to the enabling pulse line 13. It can also be seen that each of the keys 9 has the proper number of diodes 12 which are connected to the proper bit lines so that the binary coded decimal number which is produced is equivalent to the decimal number represented by the particular key 9.

It is also possible to use a number converter employing a series of OR gates in place of the diodes for conversion of the decimal number to the equivalent binary coded decimal number. For example, four gates representing the BCD equivalents of $2_{10}^0$, $2_{10}^1$, $2_{10}^2$, and $2_{10}^3$ could be employed. These gates would each represent respectively, the decimal number equivalent of $1_{10}$, $2_{10}$, $4_{10}$, and $8_{10}$. An enabling pulse OR gate would also be employed. Each of the four OR gates would have individual outputs and would also have outputs connected in common to an OR gate. These various gates would be connected in such manner that the binary coded decimal number which is produced is equivalent to the decimal number represented by any particular key 9. For example the "4" key 9 would have one line connected to the clear gate and one line connected to the $2_{10}^2$ OR gate.

The four informational bits created by the actuation of one key 9 are generated in parallel. The BCD information is then transferred to a shift register 20 through the four bit lines 14, 15, 16, 17 in the manner as illustrated in FIG. 8. The shift register 20 is included in the shift register and associated control system C, illustrated in FIG. 1. The shift register 20 comprises an entrance register or so-called "jam register" 21 and a recirculating register 22. The jam register 21 includes four bistable circuits or so-called "flip-flops" 23, 24, 25 and 26. Each of the bit lines 14, 15, 16, 17 are connected to the set or "S" input of each of the flip-flops 23, 24, 25 and 26 respectively. The flip-flops used in the apparatus of the present invention are preferably of the JK type. As used herein the JK flip-flops are of the type which are described in more detail hereinafter.

The four flip-flops 23–26 each include a set input "S," a reset input "R," "J" and "K" inputs and a trigger input "T." The flip-flops 23–26 each include a "Q" and "$\bar{Q}$" outputs. In these flip-flops the R and S inputs are unequivocal inputs, and if a pulse is placed on S, Q becomes 1, and $\bar{Q}$ becomes 0. Similarly, if a pulse is placed on R, Q becomes 0 and $\bar{Q}$ becomes 1. The J and K inputs are gated inputs so that the flip-flop will not be actuated with input signals in J or K until the T input receives a trigger pulse. Thus, it can be seen that the Q output will become true when the corresponding J input and trigger input T are rendered true, and in like manner, the Q output becomes true when the corresponding K input and trigger input T are rendered true. By further reference to FIG. 8, it can be seen that the four flip-flops 23–26 are properly labeled $2^0$, $2^1$, $2^2$ and $2^3$ respectively, representing the $2^x$ binary significance for the related decimal digit.

Differentiating capacitors 27, 27′, 28 and 28′ are interposed in each of the bit lines 14, 15, 16 and 17 respectively, to prevent jamming of the shift register 20 after one bit of information has been inserted into each of the flip-flops and before the register has been shifted. In essence, the presence of the differentiating capacitors prevents the jamming of the register 20 with the same signal. A pair of one-shot 29, 30 are interposed in the enabling pulse line 13 and provide a time delay which is sufficient to permit the four bits to be jammed into the jam register 21 before actuation of a 4-bit counter hereinafter described in detail. The first one-shot 29 actually provides the delay for settling time in the jam register 21 and the second one-shot 30 dispenses a standard pulse. The four binary coded decimal informational bits in the four flip-flops 23–26 are then transferred to the recirculating register 22 in a manner to be more fully described in detail hereinafter.

The jam register 21 also includes an OR gate 31 which serves as a shift gate and is connected to each of the flip-flops 23–26 by means of a shift bus 32. The shift bus 32 is connected to a trigger bus 32′ which carries the trigger signal and which is connected to the trigger or T input of each of the flip-flops 23–26. Furthermore, it can be seen that with the exception of the first flip-flop 23, the Q output of one flip-flop is connected to the J input of the next succeeding flip-flop through an input bus 23′ and which will carry a logical "one" signal. The $\bar{Q}$ output of each flip-flop, with the exception of the flip-flop 26 is connected to the K input of the next succeeding flip-flop through an input bus 24′ and carries a logical "zero" signal. The inputs J and K of the first flip-flop 23 are connected to the recirculating register in a manner described in detail hereinafter.

The enabling pulse line 13 is connected to a 4-bit counter 33 which is designed to shift the four informational bits placed in the jam register 21 to the right and into the recirculating register 22. The controls D illustrated schematically in FIG. 1 include the 4-bit counter 33, (often referred to as a "modulo four counter"), recirculation control gates and other control features hereinafter described and illustrated in more detail for controlling the main components of the verifier. This action will leave room for the next four binary coded decimal informational bits generated from depressing a key 9 for representation of the next decimal digit. The 4-bit counter 33 includes a flip-flop 34 which serves as a receiver of the enabling pulses in the enabling pulse line 13 generated by actuation of one of the keys 9. One output of the receiver flip-flop 34 is connected to an AND gate 35, the latter serving as a type of on-off switch. The gate 35 allows a stream of pulses from a synchronizing gate 36 to be turned on and off, the signals from the gate 36 being transmitted to the AND gate 35 through a sync bus 37.

The AND gate 35 has an output connected to a first counter 38 which is labeled $2^0$, and to one input of a three signal summing gate 39. The output of the three signal summing gate 39 is, in turn, connected to the shift gate 31 by means of a count signal bus 40. One output of the counter 38 is connected to the trigger input or T input of a second counter 41 which is labeled $2^1$. Each of the counters 38, 41 have one output tied to one of their respective inputs for feedback signals. In addition, the counters 38, 41 have their Q outputs connected to the two inputs respectively of a summing gate 42 in the manner as illustrated in FIG. 8. The output of the summing gate 42 is, in turn, connected to one input of the "three" signal summing gate 39. The other input of the "three" signal summing gate 39 is connected to one output of the receiver flip-flop 34. The output of the summing gate 42 is also connected to the input of an AND gate 43 which serves as a reset gate. The output of the reset gate 43 is inverted and is connected to one input of the receiver flip-flop 34.

In order to understand the operation of the 4-bit counter 33, it may be assumed that each of the counters 38, 41 is initially in a "0" state. When the first counter 38 receives a pulse, it will change state to a "1" condition. The counter 41, however, will not change states. On the next pulse to the counter 38, it will change back to a "0" state and this will cause the counter 41 to change states to a "1" condition. On the third pulse, the counter 38 will again change states to a "1" condition and the counter 41 will remain static. In other words, every other pulse will cause the counter 41 to change states of condition. Upon entry of the fourth pulse to the counter 38, both counters 38, 41 will change state back to a "0" condition. After four pulses from the synchronizing gate 36 have been counted, the summing gate 42 causes the reset gate 43 to generate a reset pulse causing the modulo four counter 33 to be turned to the "off" condition.

The fourth pulse to the summing gate 42 would detect a "1" condition in each of the counters 38, 41. Prior to the fourth pulse, the three signal summing gate 39 would also detect three pulses. The second counter 41 will change state to the "1" condition on the trailing edge of the fourth pulse from the synchronizing gate 36, and upon detection of the fourth pulse, the three signal summing gate 39 would transmit an input signal to the modulo four counter 34. Thus, it can be seen that for the four binary coded decimal informational bits generated by depression of each key 9, four pulses are also generated and counted by the 4-bit counter 33 for transmission to the shift gate 31. After the four BCD bits for each decimal digit are generated and inserted in parallel into the shift register 20, they are shifted four places to the right by the four pulses from the 4-bit counter 33. The precessing of the four binary digits four places to the right enables a new decimal digit to be entered into the shift register in the form of four BCD bits.

While the keyboard 8 has been illustrated and described wit keys having decimal digit indicia, it should be understood that any type of informational code could be entered into the shift register 20. For example, it is possible to enter codes in the form of alphabetic symbols. It is also possible to enter codes having combinations of decimal digits and symbols of the alphabet. In order to accomplish this latter type of information input system, it would be necessary to have a keyboard having keys for each symbol and for the decimal digits. If it were desired to use an input system for both decimal digits and alphabetic symbols, it would be necessary to enlarge the jam register 21 to six flip-flops. It would also be necessary to enlarge the recirculating register 22. While a 6-bit jam register could be employed, the preferred embodiment of the present invention encompasses a 4-bit jam register.

As indicated above, the apparatus of the present invention is not limited to the employment of the 4-bit binary coded decimal system. It is also possible to adapt the apparatus A for a 5-bit binary coded decimal system for a cyclic binary system. In addition, it is also possible to employ a grey code, an excess three's code, an alpha numeric system or a hexdecimal system, etc. The apparatus of the present invention is also adapted for use with a "two out of five code," (often referred to as a "bar code"), as will be seen hereinafter.

The shift recirculating register 22 includes forty individual flip-flops 44 which are substantially identical to the flip-flops employed in the jam register 21. It should be understood that any number of flip-flops 44 could be employed in the recirculating register 22 as indicated by the designation "(N)" in FIG. 8. However, for a 10 decimal digit number a total of 40 flip-flops 44 would be employed. The Q and $\overline{Q}$ outputs of the flip-flop 26 are each connected to OR gates 45, 46, respectively, which serve as load gates. The outputs of each of the OR gates 45, 46 are connected to the J and K inputs of the first flip-flop 44 in the recirculating register 22. The Q and $\overline{Q}$ outputs of the last flip-flop 44 in the recirculating register 22 are each connected to AND gates 47, 48, respectively, which serve as recirculating gates. The outputs of each of the AND gates 47, 48 are respectively connected to one input of each of the OR gates 45, 46 in the manner as illustrated in FIG. 8.

In essence, the recirculating register 22 is similar to the jam register 20, except that it has no provision for parallel information entry. The information entered into the jam register is only entered into the recirculating register 22 through the action of the load gates 45, 46. The informational data which is transferred out of the last flip-flop 44 of the recirculating register 22 is then compared to data from an input tape to be described in more detail hereinafter; and this data from the recirculating register is also recirculated to the input of the first flip-flop 44 of the recirculating register 22. The binary "zeroes" are gated out of the recirculating gate 47 and the binary "ones" are gated out of the recirculating gate 48. The recirculation will take place at a rate equal to the rate of data transfer from the input tape. The data in the recirculating register 22 will be compared serially bit by bit with the information from the tape, and each bit from each of the outputs will be examined for equality.

The load gates 45, 46 permit entry of data into the recirculating register 22 from either of the two sources, namely either the jam register 20 or from the recirculating register 22 itself in the form of recirculated data. The recirculating gates 47, 48 prevent the transfer of recirculated data during the transference of data from the jam register 20. Recirculation is inhibited by resetting the receiver flip-flop 34, through a resetting line 49 connecting the output of the recirculating gate 48 to an input of the receiver flip-flop 34.

The output of the recirculating register 22 is connected directly to one input of a half adder 50 or so-called "equality comparator." The other input of the half adder 50 is connected to a magnetic tape reader 51 as illustrated in FIG. 8. The magnetic tape reader 51 is included in the tape reader circuit E illustrated schematically in FIG. 1. The data from the taper reader 51 will necessarily be of the same type as the data input from the credit card. Inasmuch as the apparatus of the present invention has been described as operating on the basis of a 4-bit binary coded decimal system, the data from the tape will also be in the form of a 4-bit binary coded decimal system. If during the recirculation period, between logic pulses, the bits from the tape reader 51 and register 22 compared in the half adder 50 have been equivalent, then the sum in the half adder 50 will be "zero." The inputs to the half adder 50 from the tape reader 51 and the recirculating register 22 will be either in the form of a "zero" or a "one," and will be added as follows:

$$0+0=0$$
$$0+1=1$$
$$1+0=1$$
$$1+1=0+\text{(a generated carry)}$$

The carry output in the "one" plus "one" addition is not used. If a sum of "one" is never obtained in the half adder 50, it is a recognition that the 2-bits or words being compared are identical.

The equality comparator 50 is generally conventional in its construction and comprises a pair of flip-flops and gates necessary to achieve a summing function or a carry function. If the half adder were recognizing the characters $X$ and $Y$ then the sum $S$ would be $$S=(X\overline{Y})+(\overline{X}Y)=X\oplus Y,$$

and a carry function would be $$C=XY.$$

The half adder 50 output is connected to the reset input of a memory flip-flop or so-called "sum" flip-flop 52, which actually serves as a type of memory unit. The flip-flop 52 maintains a memory of lack of equality conditions, or the presence of any nonequality sums. The two outputs of the memory flip-flop 52 are connected to two of the inputs of a bad-card flip-flop 53. The output of the bad-card flip-flop 53 is connected to a bad card lamp 54 which is mounted on the control panel 5. Accordingly, if there was an equivalence of all bits compared in the shift register 20 with the output of the tape reader 51, the bad card light 54 will be energized. It should be recognized that any other type of advisory signal such as a bell could be employed as the means to generate advisory signals, either audible or visible signals. Furthermore, a valid card light may be optionally provided to advise of a valid credit card.

The output of the bad-card flip-flop 53 is also connected to a motor deenergization gate 55 which is, in turn, connected to an off switch forming part of a motor to be hereinafter described in detail. The output of the bad-card flip-flop 53 is additionally connected to the inhibit input of an AND gate 56, the output of which is connected to the set input of the memory flip-flop 52. This type of construction serves as a type of holding or latching circuit to maintain energization of the bad card light 54, inasmuch as a new logic pulse would deenergize the light. Furthermore, these flip-flops 52, 53 will inhibit logic pulses and inhibit the apparatus from performing any other function when the bad card lamp 54 is energized until a resetting thereof. The flip-flop 53, the light 54, gates 55, 56, the latching circuit and associated components are all included in the bad card advisory circuit illustrated in FIG. 1. The half adder 50 and the flip-flop 52 are included in the comparison circuit G.

The data storage section H retains the list of invalid credit card numbers for ultimate comparison. The data storage section H is generally mounted on the baseplate 6 and generally comprises a conventional AC electric motor 100 having a drive shaft 101 which is directly connected to a speed reducer 102. The motor 100 may also be structurally connected to the reducer 102. The motor 100 may also be structurally connected to the reducer 102 and the latter may be provided with a base flange 103 for rigid mounting to the baseplate 6. The output of the speed reducer 102 is connected to a data storage drum 104.

Figure 3:
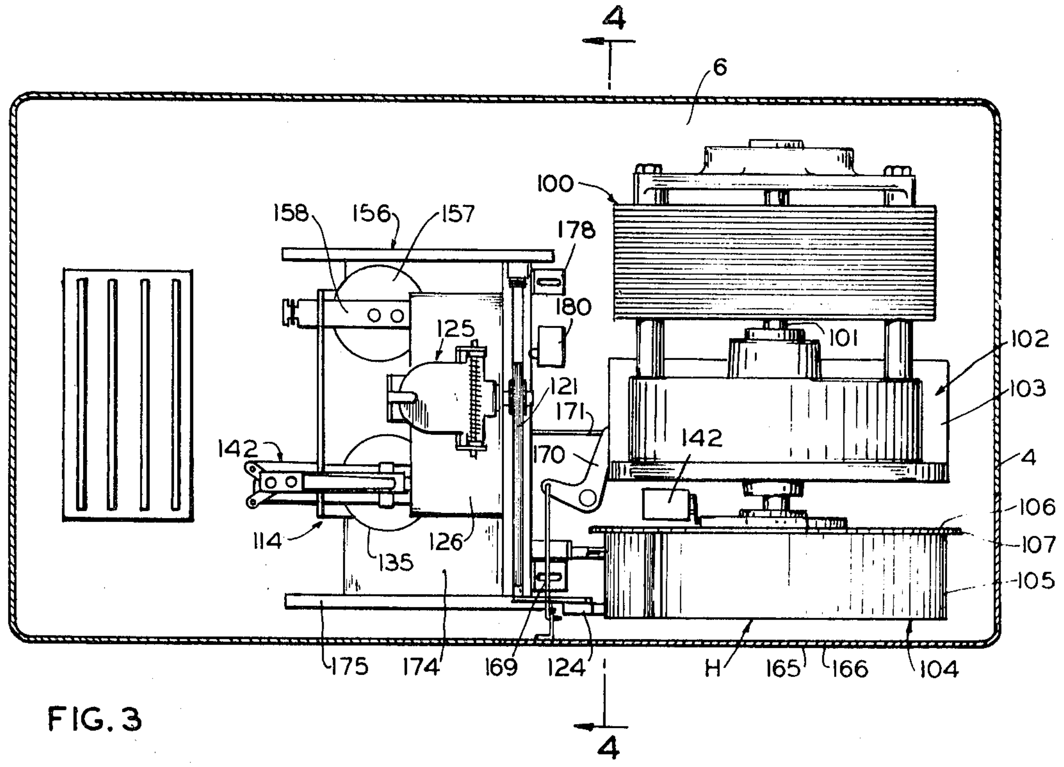
FIG. 3 is a horizontal sectional view taken along line 3—3 of FIG. 2.
Figure 4:
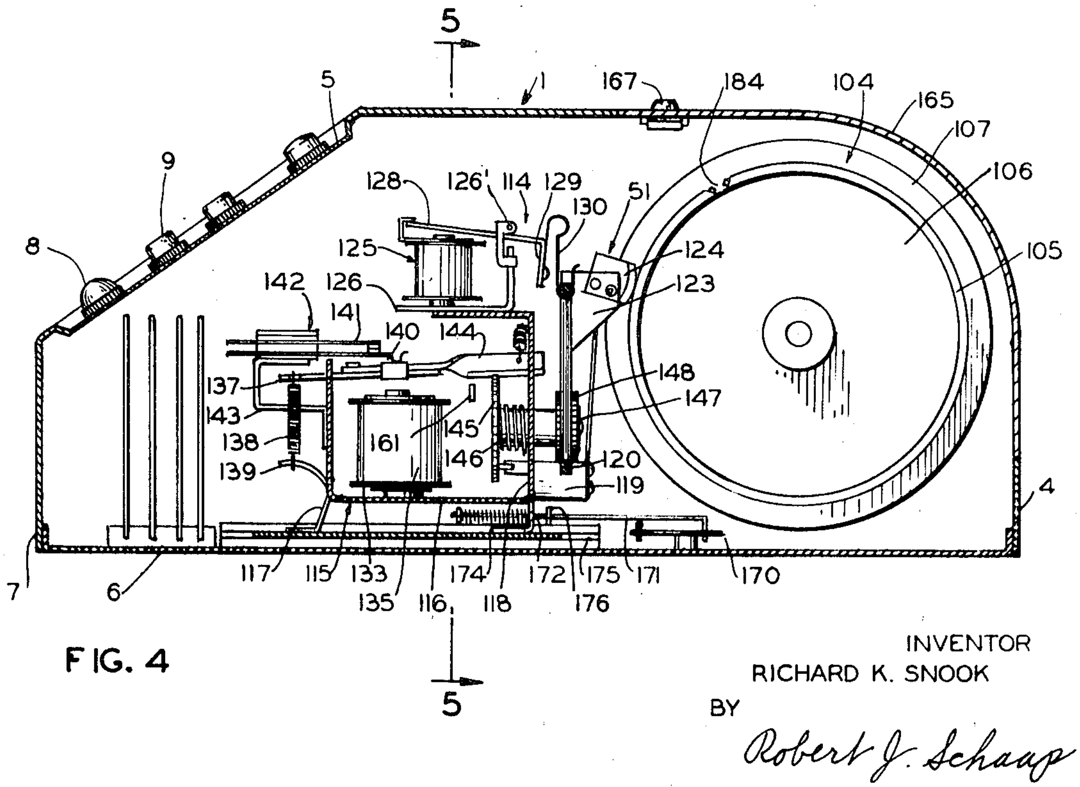
FIG. 4 is a vertical sectional view taken along line 4—4 of FIG. 3.
Figures 6, 7:
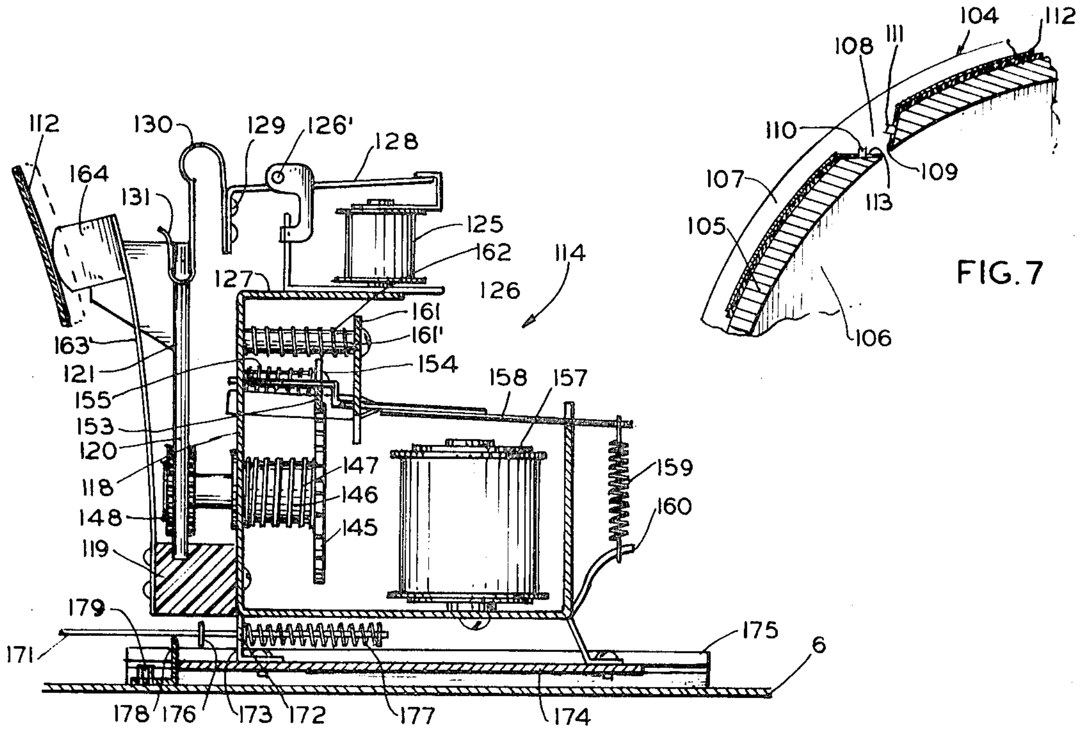
FIG. 6 is a fragmentary vertical sectional view taken along line 6—6 of FIG. 5.
FIG. 7 is a fragmentary sectional view showing the means of attaching a data tape to a drum forming part of the present invention.

The drum 104 which is more fully illustrated in FIGS. 3 and 4 may be cast from steel or aluminum or other suitable metal or it may be machined. Furthermore, the drum may be formed of any suitable plastic or synthetic resinous material such as polystyrene or polyvinylchloride. The drum 104 may be conveniently injection molded or thermoformed. The drum 104 is generally constructed with an annular sidewall 105 and a relatively flat end wall 106. An outwardly struck integrally formed annular flange 107 is formed with the sidewall 105 on the opposite margin thereof with respect to the end wall 106. The flange 107 is optionally provided and serves as an indexing means. The annular sidewall 105 is provided with a transversely extending recess 108 having transversely extending tapered walls 109 which integrally merge into the annular sidewall 105. A pair of outwardly extending, transversely spaced tape retaining pins 110 are mounted on one of the tapered walls 109, and a single outwardly extending tapered pin 111 is mounted on the opposite tapered wall 109. The pins 110, 111 are designed to removably retain a data storage tape 112, the latter to be hereinafter described in more detail. The pins 110, 111 are offset with respect to the end wall 106 so that the tape 112 may only be mounted on the drum 104 in one position as illustrated in FIG. 7. The tape 112 is provided with apertures 113 sized and located to accept the pins 110, 111. Furthermore, the tape 112 may be optionally provided on its underside with a foamed rubber surface in order to enable the tape to become taut when mounted and account for any nonlinearities in the tape.

It should be recognized that the present invention is not limited to the drum construction illustrated and described herein. Furthermore, the particular tape mounting mechanism described and illustrated herein is only exemplary and other tape mounting techniques may be employed. For example, it is possible to provide a transversely extending aperture in the annular sidewall of the drum and provide the tape with a laterally extending pin which may be removably disposed in the aperture. However, the particular system described herein has been found to be most suitable.

The tape reader 51 is more fully illustrated in FIGS. 3–6 and comprises a head escapement mechanism 114 or so-called "-head carriage" which is disposed in proximate relation to the drum 104. The head escapement mechanism 114 generally comprises a metal frame housing 115 having a bottom wall 116 with depending legs 117 for shiftable securement to the baseplate 6 in a manner to be hereinafter described. Rigidly secured to the front wall 118 of the housing 115 is a bearing block 119 having a longitudinal groove 120 on its upper face which serves as a trackway. A rectangularly shaped metal head supporting frame 121 is loosely disposed in and shiftable along said trackway 120. The horizontal lower rail of the frame 121 should be sized so that it is capable of being shiftable longitudinally between each sidewall 3 in the trackway 120 and so that it is capable of being slightly pivotal in a forward and rearward direction, that is a direction transverse to the length of the trackway 121.

Welded or otherwise rigidly secured to an upstanding strut 122 forming part of the frame housing 121 is a laterally struck head retaining flange 123 for retaining a data head or so-called "reading head" 124. The head 124 is a single track head of conventional construction and is designed to engage the data surface (outwardly presented surface) of the tape 112 when the frame housing is shifted rearwardly, reference being made to FIG. 4. The frame housing 122 and hence the reading head 124 is shifted to the "reading position," that is the laterally extended rearward position by means of an actuating solenoid 125, where the head 124 engages the drum tape 112. This solenoid 125 also controls the movement of the head 124 to the forward or "disengaged" position.

The actuating solenoid 125 is mounted on an L-shaped mounting bracket 126 which is, in turn, secured to a top wall 127 integrally formed with the front wall 118. Pivotally mounted on the upstanding arm of the L-shaped bracket 126 by means of a pivot pin 127 is an actuating plate 128 which is controlled by the solenoid 125. The plate 128 includes a depending leg 129 which retains a leaf spring 130. The leaf spring 130 is provided with a U-shaped sleeve 131 which loosely engages the top rail of the frame 121. The plate 128 is normally biased to the unactuated position or upper position in FIG. 4 by means of a coil spring 132 disposed about the pivot pin 127. Thus, when the actuating plate 128 is in the unactuated position, the head 124 will be normally biased to the disengaged position. When the actuating solenoid 125 is energized, in a manner to be hereinafter described in more detail, the actuating plate 128 will be urged downwardly to the actuated position against the action of the spring 132. This action will cause the frame 121 and data head 124 to be shifted to the "reading" position.

Mounted on the bottom wall 116 and extending transversely thereacross is a support plate 133 and secured to the support plate 133 is a stepping mechanism 134 which comprises a stepping or so-called "advancing" solenoid 135. The frame housing 115 also includes a back wall 136 which pivotally retains a stepping plate 137. The plate 137 is normally biased upwardly by means of a coil spring 138 secured to the rearward end of the plate 137 and to an outwardly struck flange 139 formed with the frame housing 115. The plate 137 carries a contact bar 140 on its upper surface which is engageable by a contact arm 141 forming part of an advancing switch 142, when the plate 137 is normally biased upwardly. The advancing switch 142 is supported by a U-shaped bracket 143 which is secured to the back wall 136. The forward end of the stepping plate 137 is bent 90° in the provision of a finger 144 which is engageable with the teeth of a ratchet 145. Upon energization of the solenoid 135, the stepping plate 137 will be urged downwardly against the action of the spring 138 and the finger 144 will engage a tooth on the ratchet 145 and cause the same to rotate through a predetermined arc. By reference to FIG. 5, it can be seen that the ratchet 145 is caused to rotate in a clockwise direction upon actuation by the finger 144. A clock spring 146 is disposed about a ratchet shaft 147 upon which the ratchet 145 is mounted and will bias the shaft 147 and ratchet 145 in a counterclockwise direction.

A pinion gear 148 is mounted on the outer end of the ratchet shaft 147 and is disposed in meshing engagement with a rack 149, the latter being formed with or otherwise rigidly secured to the upper surface of the lower rail forming part of the head supporting frame 121. Thus, upon actuation of the stepping solenoid 135, the entire frame 121 will be intermittently shifted to the left, reference being made to FIG. 5. The frame 121 will be shifted for a short predetermined distance each time that the ratchet is shifted through its predetermined arc. The head supporting frame 121 is designed to shift through thirteen individual shifts, which is one less than the total number of tracks on the tape 112. Each shift is designed to cover the distance between tracks on the tape 112. Furthermore, the head 124 is located on the frame housing 115 so that it will be positioned over each track on the tape 112 as the head supporting frame 121 is shifted through one complete cycle. One complete cycle is attained when the head supporting frame 121 shifts from one end position to the other and back to the initial end position. A limit switch 150 located at the far end of the block 119 will stop all further energization of the stepping solenoid 135, until the head supporting frame 121 has been reset to its initial end position. The finger 144 extends through a clearance aperture 151 formed in the front wall 118 and which is sized to accept the vertical movement and a slight horizontal movement as it engages the ratchet 145. In addition, the finger 144 is also biased upwardly by means of a spring 152.

A locking pawl 153 is pivotally mounted on the front wall 118 by means of a pivot pin 154 and is biased into engagement with the teeth of the ratchet 145 by means of a clock spring 155 disposed about the pin 154. The head supporting frame 121 is, therefore, prevented from being shifted back to its initial position through the action of the locking pawl 153.

Figure 5:
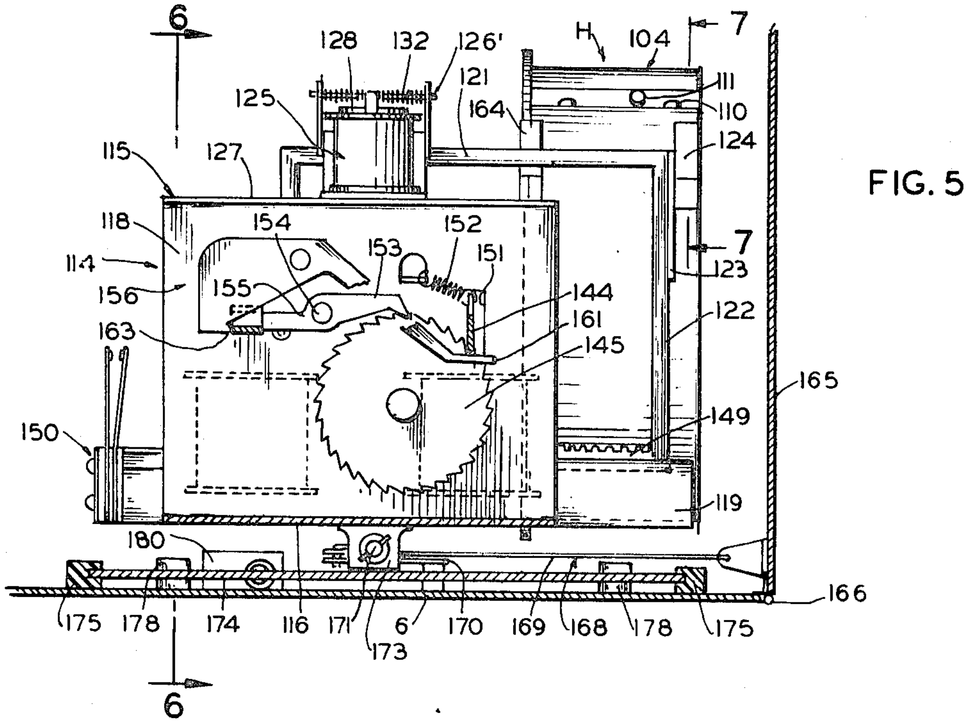
FIG. 5 is a vertical sectional view taken along line 5—5 of FIG. 4.

A resetting mechanism 156 also forms part of the head escapement mechanism 114 and generally comprises a resetting solenoid 157 which is mounted on the plate 133. The resetting solenoid 157 actuates a plate 158 which is pivotally mounted on the back wall 136 and which is biased to an upward position by means of a spring 159 secured to the plate 158 and to a flange 160 formed with the frame housing 115. The plate 158 carries a retaining arm which engages the pawl 153 and urges the same out of engagement with the teeth of the ratchet 145 when the resetting solenoid 157 is energized. The pawl 153 is normally disposed in the position as illustrated in FIG. 5 when the advancing solenoid 135 is being actuated, and is shifted to the upper position when the resetting solenoid 157 is energized.

A lifting arm 161 is pivotally mounted on the front wall 118 by means of a pivot pin 161' and is pivotally mounted to the upper position as illustrated in FIG. 6 by means of a clock spring 162 disposed about the pivot pin 161'. When in the upper position, the arm 161 will engage the finger 144 and hold it out of engagement with the ratchet 145. However, the lifting arm 161 is normally held in the down position as illustrated in FIG. 5 by means of a flange 163 formed on one end thereof. It can be seen that the flange 163 is held in such position when the resetting solenoid 157 is unenergized and the plate 158 is in the upper position, that the lifting arm 161 does not interfere with normal operation of the advancing solenoid 135 and the finger 144. However, when the resetting solenoid 157 is energized, the plate 158 will be shifted downwardly holding the locking pawl out of engagement with the ratchet 145. This will permit the ratchet to be biased to its initial position by the action of the spring 146. Furthermore, the flange 163 will be shifted over the plate 158 through the action of the spring 162 and will engage the finger 144 and hold the same out of engagement with the ratchet 145. When the resetting solenoid 157 is deenergized the plate 158 will be biased upwardly permitting each of the aforementioned components to return to their normal position as illustrated in FIGS. 5 and 6. As an alternative, the drum 104 can be stepped along a drum supporting shaft past a fixed data head, in the manner hereinafter described in detail.

Also mounted on the bearing block 119 in proximate relation to the drum 104 is an upstanding leaf spring 163′ and carried by the leaf spring 163′ is a synchronizing head or so-called "sync head" 164. By reference to FIG. 6, it can be seen that the sync head 164 is normally disposed against the magnetic tape 112 and will read only one track thereon, inasmuch as the head 164 is not shiftable. In the preferred embodiment of the invention, the tape employed is normally a 14-track tape carrying FSK or frequency shift keyed data in 13 tracks and synchronizing data on the 14 track. However, it should be recognized that any multiparallel track system could be employed.

At the beginning of any reading cycle, the data head 124 and the sync head 164 are separated by their maximum separation distance. The sync head 164 which is stationary with respect to the tape 112, will read the innermost track or last track on the tape. At the start of a cycle, the data head 124 is offset with respect to the first track of the tape 112 and the creation of a cam pulse will shift the data head 124 into alignment with the first track. At the end of a reading cycle, the data head 124 will have read the second last track and will be located in almost abutting relationship with respect to the sync head 164.

As indicated above, the 13 tracks will contain the invalid credit card numbers in FSK format. If desired, it is possible to list all of the valid credit cards on the tape and compare a specific credit card against the valid card numbers. However, the practicalities of apparatus size and recordation problems may limit the feasibility of this latter type of system. Inasmuch as the tapes are easily interchangeable, it is possible to conveniently and frequently change the tape for updated lists of invalid numbers.

The right sidewall 3, reference being made to FIG. 2, and the rear wall 4 of the housing 1 is cut away to accommodate a swingable door 165, providing access to the interior of the housing 1 and to the drum 104. The door 165 is hinged to the baseplate 6 by means of conventional leaf hinges 166 and can be locked in closurewise position by means of a conventional manually operable lock 167. The drum 104 is located in the housing 1, so that convenient access thereto is afforded when the door 165 is opened. The head escapement mechanism 114 is operatively connected to the door 165 through a shift linkage 168, so that the head escapement mechanism 114 is shifted away from the drum 104 when the door 165 is opened.

The shift linkage 168 is more fully illustrated in FIGS. 4, 5 and 6 and generally comprises a link 169 which is pivotally secured to the door 165. The other end of the link 169 is pivotally secured to one leg of a bellcrank 170, the latter being pivotally secured at its pivot point to the baseplate 6. The other leg of the bellcrank 170 is pivotally connected to an actuating rod 171 which extends through an aperture 172 formed in a depending flange 173 on the frame housing 115. The depending legs 117 of the frame housing 115 are secured to a shift plate 174 for shiftable movement along a pair of spaced guide blocks 175, toward and away from the drum 104. The rails 175 are generally circular in cross section. The actuating rod 171 is provided with a pin 176 which engages the flange 173 and urges the frame housing 115 away from the drum 104 when the door 165 is opened. A compression spring 177 is disposed on the opposite side of the actuating rod 171 with respect to the pin 176 and bears against the flange 173 for shifting the shift plate 174 and frame housing 115 toward the drum 104 when the door 165 is shifted to the closed position.

The guide blocks 175 may be welded or otherwise rigidly secured to the upper surface of the baseplate 6. The baseplate 6 is provided with positionally adjustable blocks 178 which serve as forward stops. The blocks 178 are provided with set screws 179 for adjusting the position thereof with respect to the drum 104. Thus, when the door 165 is shifted to the closed position, the spring 177 will bear against the flange 173 and urge the frame housing 115 toward the drum 104 until the housing 115 engages the forward stops 178. A limit switch 180 is positioned adjacent one of the sleeves 178 and is actuable by the frame housing 115 to enable energization of the apparatus when the switch 180 is closed. Thus, if the frame housing 115 is not shifted to its forward position upon closing of the door 165, energization of the device will not be enabled.

The comparison of the data in the shift recirculating register 22 with the data read from the tape 112 in the half adder 50 is performed at synchronizing bit time. When the bad card number data is originally recorded on the tape 112, a logic pulse which serves as a word spacer is recorded between each word. Accordingly, the data head 124 will read the logic pulses as well as the data pulses on each of the individual tracks.

Also mounted on the keyboard 5 is a start switch 181 and a clear switch 182. Each of the switches 181, 182 is a momentary switch and is normally biased to the open position. The start switch 181 is connected directly to the "on" terminal of the motor 100 and will initiate operation of the apparatus A. The start switch 181 is mechanically connected to or "ganged" to an input switch 181′ so that in essence, the start switch is a double pole switch. The input switch is interposed between the pushbutton switches 9 and the source of electrical current. A capacitor 182′ is also interposed in the input line. By reference to FIG. 8, it can be seen that when the input switch 181′ is open, the start switch 181 will be closed, and when the input switch 181′ is closed, the start switch 181 will be opened. The switch 181′ breaks the circuit to the keyboard 8 and prevents entry of more information into the apparatus until the present cycle is completed. The clear switch 182 is connected to the bad card flip-flop 53, the memory flip-flop 52 and each of the flip-flops in the shift register 20 for resetting each of these components. Resetting of these components is performed by means of an initialization pulse transmitted through a resetting or initialization line 183.

When it is desired to commence operation, the clear switch 182 is actuated for energizing the motor 100, which will, in turn, cause rotation of the drum 104. Actuation of the clear switch 182 will also initialize or clear the various components connected to the initialization line 183. The drum 104 is provided with a cam 184 on its annular surface located near one peripheral margin thereof which is capable of causing the generation of cam pulses, through the escapement mechanism 114. After the card number has been entered in the manner previously described, the start switch 182 is actuated. The cam 184 is capable of causing actuation of the advancing switch 142 located on the escapement mechanism 114. Actuation of the start switch 182 will enable the transference of cam pulses to the head escapement mechanism 114. Each revolution of the drum 104 will cause the cam 184 to actuate the advancing switch 142, thereby generating the cam pulse. The cam pulse will energize the advancing solenoid 135 thereby actuating the stepping switch 134. The frame 121 will be shifted to a position where the data head 124 is disposed in alignment with the next adjacent track, in the manner described hereinabove. After the frame 121 has been shifted so that the head 124 has been positioned over the last of the 13 tracks, the frame 121 will cause actuation of the limit switch 150 which will enable deenergization of the motor 100. By reference to FIG. 8, it can be seen that the switch 150 is connected to one input of the OR gate 55 which is connected to the "off" terminal of the motor 100. The OR gate 55 serves as the deenergization gate and has the other input connected to the output of the bad-card flip-flop 53.

The cam 184 must be sufficiently long to allow enough time for the advancing solenoid 135 to be energized; generally 18 to 20 milliseconds The synchronizing head 164 is always in engagement with the tape 112 and will continuously read synchronizing pulses during the rotation of the drum 104. When the data head 124 is shifted into engagement with the tape 112, it will read an initial logic pulse and then 40 bits of information, followed by another logic pulse. The synchronizing head 164 is connected to a preamplifier 186 which is, in turn, connected to a synchronizing amplifier 187. The output of the synchronizing amplifier 187 is connected to one input of the gate 35. The output of the synchronizing amplifier 187 is also connected to one input of a head position gate 188. The other input of the gate 188 is inhibited and connected to the switch 142. The output of the head position gate 188 is connected to the synchronizing gate 36. It can be seen that the synchronizing pulses read from the tape 112 are transferred directly to the shift gate 31; and four pulses which then serve as shift pulses will be admitted to the shift register 20 through the action of the 4-bit counter 33.

The preamplifier 187 is preferably a level normalizing type of amplifier. A conventional Schmidt trigger may be substituted for the preamplifier 187. The synchronizing track will preferably have a sinusoidal recording and the preamplifier 187 will enable the creation of a synchronizing pulse or so-called "clock pulse" which provides proper timing for the operation.

The data head 124 is connected to a preamplifier 189 which is, in turn, connected to a filter 190. The filter 190 is provided with three outputs which represent a "one" signal, a "zero" signal and a logic signal or pulse. In the employment of the FSK system where FSK recording is placed on the tape 112, a separate frequency is assigned to each output of the filter 190. These three frequency levels will then represent the binary one level, the binary zero level and the logic pulse, respectively. The filter 190 will pass only these three frequencies and eliminate any extraneous noise from the system. Furthermore, the filter 190 will eliminate any amplitude instability.

The logic output of the filter 190 is connected to the input of an AND gate 191 and the output of the head position gate 188 is connected to the other input of the AND gate 191. The AND gate 191 is connected directly to a track shift flip-flop 192 and the switch 150 is connected to a pair of inputs of the flip-flop 192. The output of the track shift flip-flop 192 is connected to one input of the synchronizing gate 36. The logic output of the filter 190 and the output of the track shift flip-flop 192 is connected to a logic pulse gate 193. The sync bus 37 is also connected to the third input of the logic pulse gate 193.

The synchronizing head which is normally in engagement with the sync track of the tape 112 will send sync pulses to the head position gate 188. When the switch 142 is closed and the data head 124 is being shifted from track to track, the head position gate 188 will remain closed. However, when the head 124 is aligned with and shifted to the reading position at the next track, the head position gate 188 will open passing sync pulses to the AND gate 191. The gate 191 will also remain closed until receipt of the next logic pulse. When a logic pulse is received at the AND gate 191 from the filter 190, the track shift flip-flop will be actuated. Actuation of the flip-flop 192 is an indication that the data head 124 is in the reading position. This will set the track shift flip-flop 192 and inhibit the pulse output of the logic gate 193. The setting of the track shift flip-flop 192 takes place at the logic pulse time. Furthermore, the reading of the logic pulses will take place at sync pulse time.

Upon initiation of a cam pulse, the advancing switch 142 will close and index the data head 124 into alignment with the first information track on the tape 112, and this enables the head position gate 188. A sync pulse is passed through the gate 188 and this is gated with the logic output to the track shift flip-flop 192. When the head 124 is in reading position, a logic pulse and sync pulse is received in the gate 191, and in the logic pulse gate 193. The first pulse after the logic pulse is the first digit of the first word. Accordingly, the contents of the shift register 20 must be shifted to enable comparison in the half adder 50. In essence, the first logic pulse enables synchronization of the apparatus with the sync pulse. At this time, the shift gate 31 is opened and allows a shift pulse to pass into the shift register 20. When the head 124 is in reading position, the track shift flip-flop 192 remains in the set state until the next cam pulse is generated. It should be recognized that the sync pulse is used to gate the logic pulse gate 193 in synchronizing time. The logic pulse gate 193 is enabled only after the first logic pulse and then on receipt of every subsequent logic pulse. If the first logic pulse did pass there would be no comparison in the half adder 50 since the information in the shift register 20 is not recirculating at the time of the first logic pulse, and the flip-flops 52, 53 were reset by the previous logic pulse prior to the cam pulse.

The binary one and binary zero pulse outputs of the filter 190 are connected to an exclusive OR gate 194 forming part of a read error circuit 195. The output of the exclusive OR gate 194 is connected to one input of an AND gate 196 which also forms part of the read error circuit 195. The other input of the AND gate 196 is connected to the sync bus 37, and the output of the gate 196 is inverted. The read error circuit 195 is designed to determine if an error occurred in the reading process and is an optional circuit. The exclusive OR gate 194 should detect only a "one" or a "zero" pulse condition. When a sync pulse is received at the gate 196, if neither a "zero" not a "one" pulse condition or both a "zero" and "one" pulse condition existed at the OR gate 194, then an error exists.

The output of the read error circuit 195 is connected to an OR gate 197 which is, in turn, connected to an error flip-flop 197'. The reset terminal of the error flip-flop 197' is connected to the "on" terminal of the motor 100. The output of the error flip-flop 197' is connected to an error light 198 which is mounted on the control panel 5. The error light 198 is also an optional component. If an error is detected by the read error circuit 195, the error flip-flop 197' is actuated and this will cause energization of the error light 198. The error flip-flop 197' is also connected at its reset terminal to the clear switch 182 and can be reset by merely actuating the clear switch 182. This action will also deenergize the error light 198. It is to be noted that examination of the conditions of the exclusive OR gate will only take place at the time of existence of a sync pulse.

The "one" pulse output of the filter 190 is connected to the half adder 50 for comparison with the recirculating information in the shift register 20. The output of the logic pulse gate 193 is connected to a one shot 199. The signal from the filter 190 is compared to the recirculation output from the recirculating register 22 in the half adder 50. If the two words examined are not identical, then a pulse in the one shot 199 will reset the memory flip-flop 52. The one shot 199 delays the transference of clear pulses to the flip-flop 52 when comparison is made at logic pulse time and prevents actuation of the latching circuit during the time delay.

In actual construction, the components forming part of the electrical circuit as illustrated in the logic diagram of FIG. 8 are made by printed circuits in the form of printed circuit boards and are so illustrated in FIGS. 3 and 4. It should also be recognized that other bistable storage elements could be substituted for any of the flip-flops used in any of the apparatus of the present invention. For example, image storage tubes, cross coupled NAND gates or magnetic cores could be substituted for the flip-flops.

OPERATION

In use, the attendant operating the apparatus A will, upon receipt of the customer credit card, actuate the clear key 182 which will reset each of the flip-flops in the entire shift register 20. This action will also reset the bad card flip-flop 53 and deenergize the bad card light 54, if the latter had been energized. Furthermore, it will break any action in the latching circuit. After each of the aforementioned components has been reset, the operator will actuate the various keys 9 to insert the decimal digits representing the card number into the apparatus A. Actuation of any one key 9 will generate four informational bits which are transferred to the four flip-flops of the jam register 21 through the 4-bit lines 14–17. The differentiating capacitors 27–28' along with the one shots 29, 30 will prevent the jamming of the register with the same signal.

The 4-bit counter 33 receives an informational pulse from the diode matrix 11 through the enabling pulse line 13. Shift pulses are received at the shift gate 31 through the sync bus 37 and from the sync gate 36. When the shift gate 31 is enabled by the action of the 4-bit counter 33, the four pulses or BCD bits in the jam register 21 will be shifted four places to the right to the first four flip-flops 44 in the recirculating register 22. This action empties the four flip-flops 23–26 for acceptance of four more BCD bits upon actuation of the next key 9.

The 4-bit counter 33 will enable the processing of the four binary digits four places to the right in the shift register 20. The first pulse to the 4-bit counter 33 will change the state of the first counter 38 from a zero to a one condition. The second pulse will change the state of the first counter 38 back to a zero condition but will change the state of the second counter to a one condition. The fourth pulse to the summing gate would detect a one condition in each of the counters 38, 41 and immediately prior thereto, the three signal summing gate would detect three pulses. Upon detection of the fourth pulse the reset gate 43 would transmit a signal to the receiver flip-flop 34, thereby resetting the latter. In addition, the three signal summing gate 43 would enable the shift gate 31 to shift the data in the jam register 21 into the recirculating register 22. The recirculating gates 47, 48 are closed at the time of information entry into the jam register 21 in order to prevent any recirculation from taking place. After the 10 decimal digits have been entered by 10 actuations of any of the keys 9, the apparatus A is capable of operating.

Thereafter, the operator will actuate the start switch 181 which will reset the error flip-flop 197'. The closing of the clear switch 182 has previously energized the motor 100 which caused rotation of the drum 104. The input switch 181' will open preventing any further entry of information into the apparatus until the comparison cycle has been completed, at which time the switch 181' will close. While the card number was being introduced into the apparatus, the load gates 45, 46 were opened and the recirculating gates 48, 49 were closed. The actuation of the start switch 181 will enable the recirculation gates 48, 49 and close the load gates 45, 46.

At this point, it should be noted that the operator could easily and conveniently change the tape 112 on the drum 114 by opening the door 165. Opening of the door 165 will shift the entire head escapement mechanisms 114 forwardly enabling access to the drum 104. After the new tape 112 has been properly placed on the drum 104, the door 165 is closed and this will automatically shift the head escapement mechanism rearwardly.

When the drum 104 is rotating the sync head 164 will be in engagement with the first or sync track and will continually read sync pulses. At the beginning of any cycle, the head supporting frame 121 is located so that the data head 124 is normally in alignment with the 13 track, closing the switch 150. However, upon initiation of the new cycle, the frame 121 is shifted back to the start position where the data head 124 is offset from the first tape track by a distance approximately equal to the sequential shifts of the data head 124 with respect to the drum 104. The head 124 will be shifted rearwardly to the reading position with the head supporting frame 121 and into alignment with the first track at the cam pulse time first following the start command.

The first pulse read by the data head 124 will be a logic pulse and the 40 pulses thereafter will be information pulses. Each 40 pulses representing a 10 decimal digit number will be followed by a logic pulse. The data read by the data head 124 is passed through a filter 190 and the "one" and "zero" level outputs are passed into the read error circuit 195. If neither a "one" nor a "zero" condition or both a "one" and a "zero" condition exist at the exclusive OR gate 194 at sync pulse time, then the error flip-flop 197' will be actuated and this will energize the error light 198. If proper conditions exist at the exclusive OR gate 194, then the error light 198 will not be energized.

The one condition output is transmitted to the half adder 50. In addition the recirculation gates 48, 49 are enabled for permitting data in the recirculating register 22 to recirculate. However, the load gates 45, 46 will be closed during the recirculation period. It can also be seen that during the jamming of information into the jam register 21, the recirculation gates 48, 49 are closed preventing any recirculation of information. The information recirculating out of the recirculating register 22 is compared serially bit by bit with the information passing out of the filter 190 in the half adder 50. It should be noted that the data on the tape 112 is read in reverse order so that bits of similar significance are presented to the half adder 50 simultaneously.

When the two numbers compared in the half adder 50 are identical, a "zero" condition with a carry will be generated. The carry however, is not used since the apparatus only examines for equivalence or lack of equivalence of two words. The memory flip-flop 52 will determine whether or not a condition of a lack of equality existed during the examination of any of the compared bits of information in the half adder 50. After the examination of all of the bits of information, if a complete equivalence was detected, then the bad-card flip-flop 53 will be actuated and thereby energize the bad card light 54. If at any time during the examination of the contents of the shift register 20, there was a lack of equivalence then the bad-card flip-flop 53 will not be actuated. This latter condition will indicate that the credit card bearing the number placed in the shift register 20 is a valid credit card. Furthermore, when the bad-card flip-flop 53 is energized, the latching circuit will hold the bad-card flip-flop 53 in the set condition and maintain energization of the bad card light 54, until the entire apparatus is reset by actuation of the clear switch 182.

In actual practice, if the apparatus A provides an indication of an invalid credit card, it might be desirable for the operator to double check by again repeating the above operation. In the alternative the operator may wish to recheck the decision of the apparatus A by examining a bad credit card list, if the latter is available.

After the first revolution of the drum 104 the cam 184 will close the switch 150 causing the generation of a cam pulse. This will cause the head escapement mechanism 114 to shift the data head 124 to the next adjacent track. At sync pulse time, the head position gate 188 will be enabled thereby setting the track shift flip-flop 192. Again, reading of the data will not take place until the first logical pulse occurs. The reading of the data on this track and all additional tracks will take place until all of the information on the 13 tracks has been examined. After the data head 124 has examined the last track, the switch 142 will be closed, thereby deenergizing the motor 100. At this point, the apparatus is in condition for repeating of the cycle previously described and examination of another credit card number.

AUTOMATIC CARD READER AND VERIFIER

Figure 9:
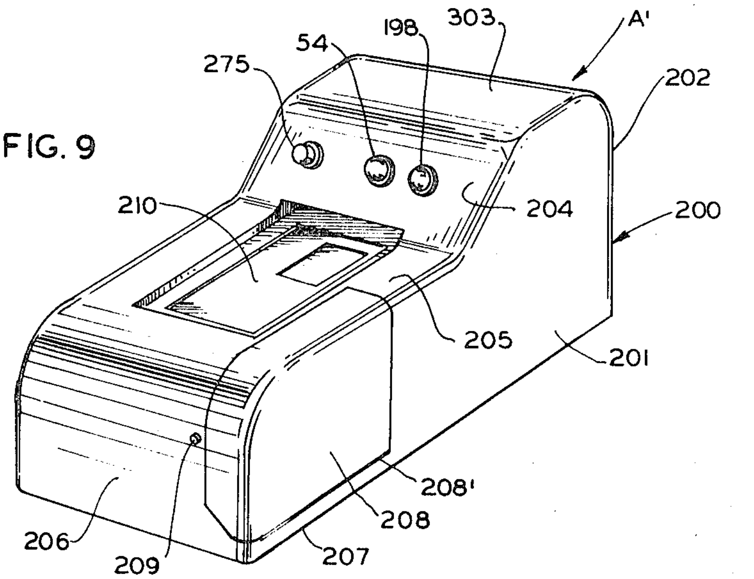
FIG. 9 is a perspective view of a modified form of credit card verifying apparatus of the present invention.

It is possible to provide a modified form of credit card verifying apparatus or so-called "verifier" A', which is more fully illustrated in FIGS. 9–12. The verifier A' is similar to the verifier A and comprises an outer housing 200 having a pair of opposed sidewalls 201, a backwall 202 and a relatively short top wall section 203. The top wall section 203 integrally merges into a relatively short vertical wall 204 which, in turn, is formed with a relatively flat horizontal wall 205. A front wall 206 integrally merges into the horizontal wall 205 in the manner as illustrated in FIG. 9. The housing 200 is also secured to a baseplate 207 by any conventional fasteners such as screws.

The right sidewall 201, reference being made to FIG. 9 and the front wall 206 are cut away to accommodate a swingable door 208 providing access to the interior of the housing 200. The door 208 is hinged to the sidewall 201 by means of conventional leaf hinges 208' and can be locked into closurewise position by means of a conventional manually operable lock 209. The horizontal wall 205 is cut away to accommodate a card retaining tray 210 forming part of a card reading mechanism 211. The horizontal wall 204 is cut away in the provision of an intake aperture 212.

The verifier A' is designed to electronically sense or "read" the credit card number to be compared, by means of an optical scanning mechanism 213 which forms part of the card reading mechanism 211. This type of apparatus, therefore, eliminates the necessity of a keyboard-type of input. However, it should be understood that the apparatus A and B could be combined so that an optical scanner and keyboard may be provided in the same device for optional selection of the desired type of input.

The verifier B is ideally designed for use in the dispensing of goods and services from gasoline service stations and similar types of retail store operations, since many of the purchases from these types of operations are conducted on a credit basis. It is a customary practice for many of the large oil companies and similar types of retail operations to issue credit cards to their customers. These credit cards bear the identification of the customer and a credit card number which has been assigned to that particular customer. After a purchase has been made, the attendant generally causes the information on the c9edit card to be inscribed on a charge ticket or invoice. It is a common practice for the retail outlet to retain one copy which has been executed by the customer for billing purposes, and to provide the customer with a carbon copy thereof. The information on the credit card is generally inscribed on the charge ticket by passing the credit card in overlying marginal registration with the charge ticket through a pair of rollers. The charge ticket generally is provided with a carbon sheet or inked paper insert for causing the information to be transferred from the card to the charge ticket. The identification information and credit card number are generally embossed on the credit card to facilitate the transference of this information.

In addition to the decimal digit card number appearing on a credit card, the card often contains a bar code number as well. The bar code, which is normally a "two out of five code", usually facilitates digital data information processing by the issuer of the credit card. The bar code which appears in the form of a series of small bars is also usually embossed on the credit card. It is a common practice to scan the bar codes by mechanical fingers which physically engage the underside of the card and sense the size, location and/or number of recesses represented by the embossments forming the bar code. However, if any dirt or foreign particles have become embedded in the recesses or if the card is bent or otherwise deformed, this type of scanning technique becomes fouled and inaccurate. The present invention, therefore, employs a novel-type of optical scanning technique for reading the bar code.

The bar code may also be in the form of the binary coded decimal system and is often a 4-bit BCD system. The bar coded cards are generally presented in a 5-bit BCD system; but it is a simple and conventional matter to convert the 5-bit system to a 4-bit system. The present invention is uniquely adapted to read and accept inputs of either bar codes or 1—2—4—8 BCD information. For example, the three decimal digits of 8, 9 and 0 are related to bar BCD code and 1—2—4—8 BCD system as follows:

| Decimal | Bar BCD | 1—2—4—8 BCD |
|---|---|---|
| $8_{10}$ | 0 | 1 ($2^3$) |
| | 1 | 0 ($2^2$) |
| | 0 | 0 ($2^1$) |
| | 0 | 0 ($2^0$) |
| | 1 | |

TABLE—Continued

| Decimal | Bar BCD | 1—2—4—8 BCD |
|---|---|---|
| $9_{10}$ | 0 | 1 |
| | 0 | 0 |
| | 1 | 0 |
| | 1 | 1 |
| | 0 | |
| $3_{10}$ | 0 | 0 |
| | 1 | 0 |
| | 1 | 1 |
| | 0 | 1 |
| | 0 | |

Rigidly mounted on the baseplate 207 by means of sheet metal screws are a pair of spaced opposed forward and rearward L-shaped brackets 214, 214'. Also mounted on the baseplate 207 and spaced slightly forwardly of the bracket 214' is a third L-shaped bracket 215. The brackets 214 and 215 are apertured to accommodate conventional ball bearings 216. Journaled in the bearings 216 and extending between the brackets 214, 215 is a worm shaft 217 which carries a worm gear 218. A conventional AC electric motor 219 is suitably mounted on the bracket 215. The motor 219 may be provided with a cord set (not shown) for connection to a suitable source of electrical current. The motor 219 drives a worm 221 for rotation of the worm shaft 217.

Mounted on the rearward end of the worm shaft 217 is a spur gear 222 which meshes with an idler gear 223, the latter also being journaled in the bracket 214 through a conventional ball bearing 224. The brackets 214, 214' are also apertured to accommodate a pair of spaced opposed ball bearings 225 for accommodating a drive shaft 226. By reference to FIGS. 10 and 11, it can be seen that the drive shaft 226 is located in upwardly spaced relation to the worm shaft 217. Mounted on the rearward end of the drive shaft 226 is a drive gear 227 which meshes with the idler gear 223 causing rotation of the drive shaft 226 upon energization of the motor 219.

The main drive shaft 226 is provided with a pair of opposed spiral grooves 228 for the greater portion of its length for causing reciprocative movement of a drive block 229. The drive block 229 is provided with an internal pin or follower 230 which extends into the grooves 228 and causes the block 229 to shift back and forth, reciprocatively, along the shaft 226 as the shaft 226 rotates. The shaft 226 is provided at the ends of the spiral grooves 228 with a pair of circular end grooves 231 for reversing the direction of movement of the drive block 229.

Mounted on the upper ends of the brackets 214, 214' are a pair of transversely spaced opposed rails 232 for supporting the card retaining tray 210. The retaining tray 210 is provided with four depending rollers 233 which ride on the rails 232 enabling movement of the tray 210. The rollers 233 are secured to depending flanges 234 formed along each of the longitudinal margins of the tray 234 by means of supporting pins 235. By further reference to FIG. 11, it can be seen that the underside of the tray 210 is secured to the drive block 229 so that the tray 210 will be reciprocatively driven with the drive block 229.

The rollers 233 have enlarged peripheral flanges 236 which bear against the flat surfaces of the rails 232 for holding the tray 210 in proper alignment. It is also possible to employ three rollers in order to establish a so-called "three-point" carriage, thereby reducing the parallelism required in the rails 232. Furthermore, it would be possible to employ flanged ball bearings on spring loaded shafts for the same purpose. In addition, a pair of laterally struck flat spring shoes 237 are secured to the underside of the tray 210 and bear against the underside of each of the rails 232 for holding the tray 210 against the rails 232.

Figure 10:
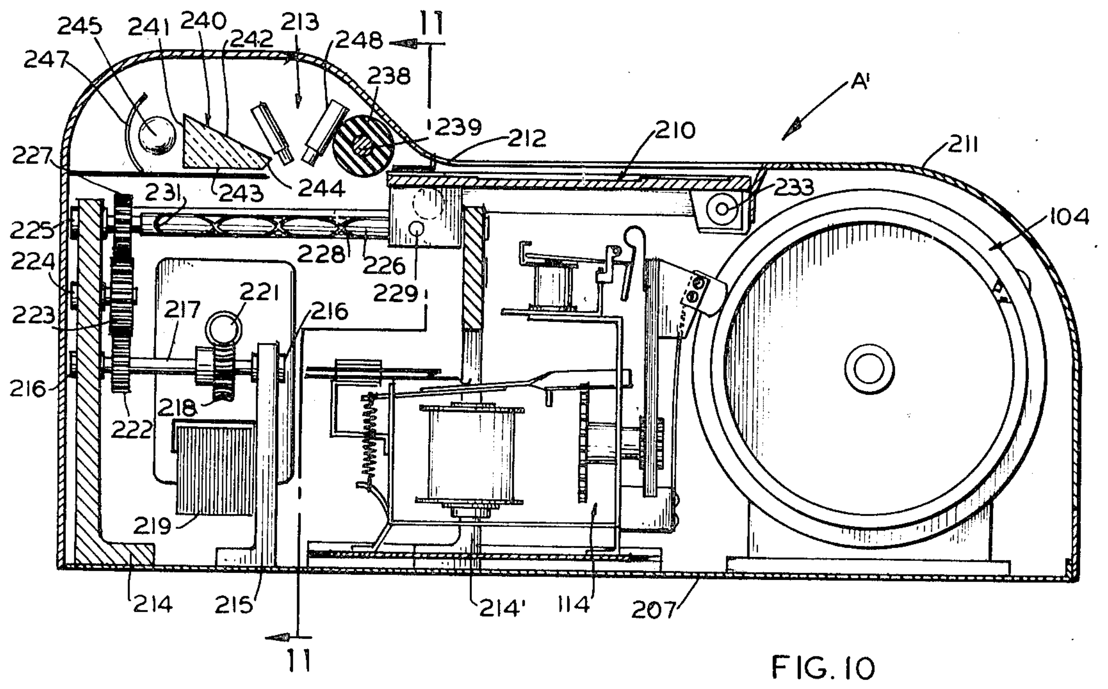
FIG. 10 is a vertical sectional view taken along line 10—10 of FIG. 9.

By further reference to FIG. 10, it can be seen that the retaining tray 210 extends through the intake aperture 212. When a credit and invoice slip is placed on the tray 210 and the motor 219 is energized, the drive shaft 226 will rotate causing the drive block 229 to shift rearwardly and then forwardly in a complete cycle. This driving action is accomplished through the gearing mechanism previously described. As the drive block 229 is shifted, the tray 210 will also be shifted therewith.

A printing roller 238 mounted on a roller shaft 239 is conventionally journaled in the sidewalls 201. The roller shaft 239 is preferablv spring loaded and biased downwardly so that it will bear against the card and an invoice sheet disposed on the tray 210 as the tray 210 passes therebeneath. A lower roller (not shown) may be provided and conventionally journaled in the housing 200 for supporting the tray 210 as it passes beneath the printing roller 238. The invoice is preferably formed of the ink capsulated paper which causes the printed image to appear on the upper surface of the paper when pressure is applied thereto. When the printing roller 238 contacts the upper surface of the paper and urges the latter into intimate contact with the embossments of the credit card the embossments will appear as printed matter on the upper surface of the invoice.

It is possible to employ an inking roller which has an inked ribbon trained therearound to actually print on the upper surface of the invoice, as the tray is being shifted into the housing. However, in this arrangement, it would be desirable to bias the inking roller out of contact with the invoice as the tray 210 is shifted outwardly of the housing 200. It is also possible to use a stripper knife to separate the invoice from the credit card after printing on the invoice and by a suitable roller system roll the invoice back and outwardly of the housing 200 through a slot formed in the housing 200. As another alternative, it is possible to design the housing with two entrance slots so that the tray 210 will move through the intake aperture and outwardly through a second aperture at the rear of the housing. Furthermore, in place of a spring loaded roller 238 it is possible to use a roller which is not biased and a camming profile on the rails 232 in order to shift the tray 210 into contact with the roller 238.

Mounted on the underside of the top wall 203 and forming part of the card reading mechanism 211 is the optical scanning mechanism 213. The optical scanning mechanism 213 comprises a prism 240 having a flat end wall 241 and a rearwardly facing inclined wall 242 which is silver coated to serve as a mirrored surface. The prism 213 is also provided with a relatively flat bottom wall 243 connected to a relatively thin downwardly facing inclined wall 244 which serves as a light emitter. A conventional lamp 245 is mounted in a pair of brackets 246 depending from the top wall 203 and causes light to pass through the prism 240. An arcuate reflector 245 is disposed forwardly of the lamp 245. Light beams are reflected off of the mirrored surface 242 and pass through the light emitter 244. The light passing through the emitter 244 is directed upon the bar code embossed on the card for "reading" the information contained in the bar code. A bank of five photocells 248 is located immediately rearwardly of the light emitter 244 and detects the reflected light from the card.

The photocells employed are light sensitive photocells having resistance characteristics which change as a function of radiant energy incident thereupon. The photocells 248 are connected in series with one or more other properly selected resistors to form a voltage divider network. When light is directed on the ends of the photocells 248, the resistance will decrease, causing a current increase. This will, in turn, cause a voltage change. The resistors are selected so that the voltage change is compatible with the integrated circuit. Furthermore, the resistors are selected so that the voltage change resulting from the two levels of light would be equivalent to a logical "-zero" or logical "one".

The informational bits generated by the optical scanning mechanism 213, from the reading of the "two out of five code," (bar code) is then transferred to a code conversion matrix 250. In the case of the apparatus A' presently described herein, the code conversion matrix 250 is actually a five-to-four conversion matrix. This matrix 250 will generate four informational bits which are equivalent to the five informational bits read by the optical scanning mechanism 250.

The code conversion matrix 250 is provided with 4-bit lines 251, 252, 253, and 254 which are connected to four flip-flops 255, 256, 257 and 258, respectively, forming part of a jam register 259. In a manner similar to the apparatus A, the bit line 255 represents the binary coded decimal digit $2^0$, the bit line 256 represents the binary coded decimal digit $2^1$; the bit line 257 represents the binary coded decimal digit $2^2$ and the bit line 258 represents the binary coded decimal digit $2^3$.

The 4-bit lines 251–254 are also connected to an OR gate 260 which serves as a start shift gate and the output of the gate 260 is connected directly to a one-shot 261 which serves as a place shift delay and which forms part of a 4-bit counter 262. The output of the optical scanning mechanism 213 is also connected to a settling time circuit 263, the output of which is connected directly to the second input of the code conversion matrix 250. The settling time circuit 263 insures that physical misalignment of the credit card or slight damage to the bar code will not interfere with proper reading thereof.

The settling time circuit 263 comprises an OR gate 264 which is connected to a first one-shot 265 which, in turn, serves to delay the transference of information. The one-shot 265 is connected to a second one-shot 266 which provides a settling time. The first one-shot 265 will have a relatively long delay time compared to the second one-shot 266. When the credit card passes beneath the optical scanning mechanism 213, the photocells 248 will begin to examine the bar code and sense the transition of light to dark regions on the card. This would constitute a recognition of a character time. However, if the card was skewed slightly or misaligned when placed in the card retaining tray 210, the photocells 248 would not examine all five elements of the bar code representing any decimal digit at one time. Accordingly, the first one-shot 265 provides a sufficient time delay to insure that the center of each bar element is being examined as opposed to the initial transition of light to dark areas on the card. In essence, this delay provides a transitional effect.

In essence, the one-shot 261 delays the initiation of the 4-bit counter 262 to achieve a settling time in the jam register 259 before enabling shift pulses to shift the data into the recirculating register. The one-shot 266 serves as a standard pulse dispenser and meters out pulses shorter than the width of the bars on the bar code. In essence, this one-shot 266 serves a center slicing function. It should also be recognized that the velocity of movement of the card reader 211 is such that the informational spacing in time is greater than the length of time for generation of the four shift pulses.

The 4-bit counter 262 also includes a receiver flip-flop 267 which serves as a receiver of the pulses transmitted by the shift delay one-shot 261. One output of the receiver flip-flop 267 is connected to an AND gate 268 which serves as a type of on-off switch. The gate 268 is connected to the previously described sync gate 36 through the sync bus 37 and will allow the stream of clock pulses from the gate 36 to be turned on and off. A single short pulse is generated in the code conversion matrix 250 to set the flip-flops 255–258 of the jam register 259. This set pulse in combination with the shift delay which is hereinafter described in detail, will prevent any shifting of the data in the jam register 259 while the input register has a set input on any jam input. Entrance of data at this time in the recirculating shift register 22 would enter erroneous data into the recirculating register 22. The jam register 259 also includes an OR gate 269 which serves as a shift gate and is connected to each of the flip-flops 255–258 by means of a shift bus 270. The shift bus carries the trigger signal to each of the flip-flops 255–258.

After the receiver flip-flop 267 has been set, the AND gate 268 will permit sync pulses from the sync head 36 to enter the 4-bit counter 262 and through the shift gate 269 process the data from the jam register 259 into the recirculating register 22. Processing of the data will actually take place through the load gates 45, 46.

The 4-bit counter 262 also includes a first counter 271 which is labeled $2^0$ and which is connected to the output of the AND gate 268. The output of the first counter 271 is connected to the input of a second counter 272 which is labeled $2^1$. The inputs to the AND gate 268 are shifting from a "zero" state (false state) to a "one" state (true state) and back to a "-zero" state at a constant rate. The first pulse to the shift gate 269 will also shift the first counter 271 to a "one" state, but will not cause a transition of states in the second counter 272. On the down clock of the second pulse, the first counter 271 will shift to a "zero" state and the second counter 272 will shift to a "one" state. On the third pulse the first counter 271 will shift back to the "zero" state and on the fourth pulse both counters 271, 272 will be in the "one" state or true state or true state.

The outputs of each of the counters 271, 272 is connected to the two inputs of a sum gate 273 and the output of the sum gate 273 is connected to the input of a reset gate 274. The output of the reset gate 274 is, in turn, connected to the reset inputs of each of the counters 271, 272 and the receiver flip-flop 267. At the down clock of the third pulse the sum gate 273 is opened and this will enable the fourth pulse to be gated with the sum output and reset the receiver flip-flop 267 and the two counters 271, 272. Thus, four shift pulses are generated which cause the character information in the first four flip-flops 255–258 to be transferred into the recirculating register 22.

A combination clear-start switch 275 is mounted on the horizontal wall 205 and is designed to initiate operation of the apparatus A'. The switch 275, which is in the form of a push-button switch is connected to the "on" input of the motor 100 and will energize the same when the switch 275 is actuated. In addition, the switch 275 is connected to the modulo four counter 267 and to the bad-card flip-flop 53 for resetting each of these components, by means of an initialization pulse transmitted through a resetting line 275'. The switch 275 is also connected to the reset inputs of each of the flip-flops in the shift register 295 through the resetting line 276 for initializing each of these components.

Figures 12, 15:
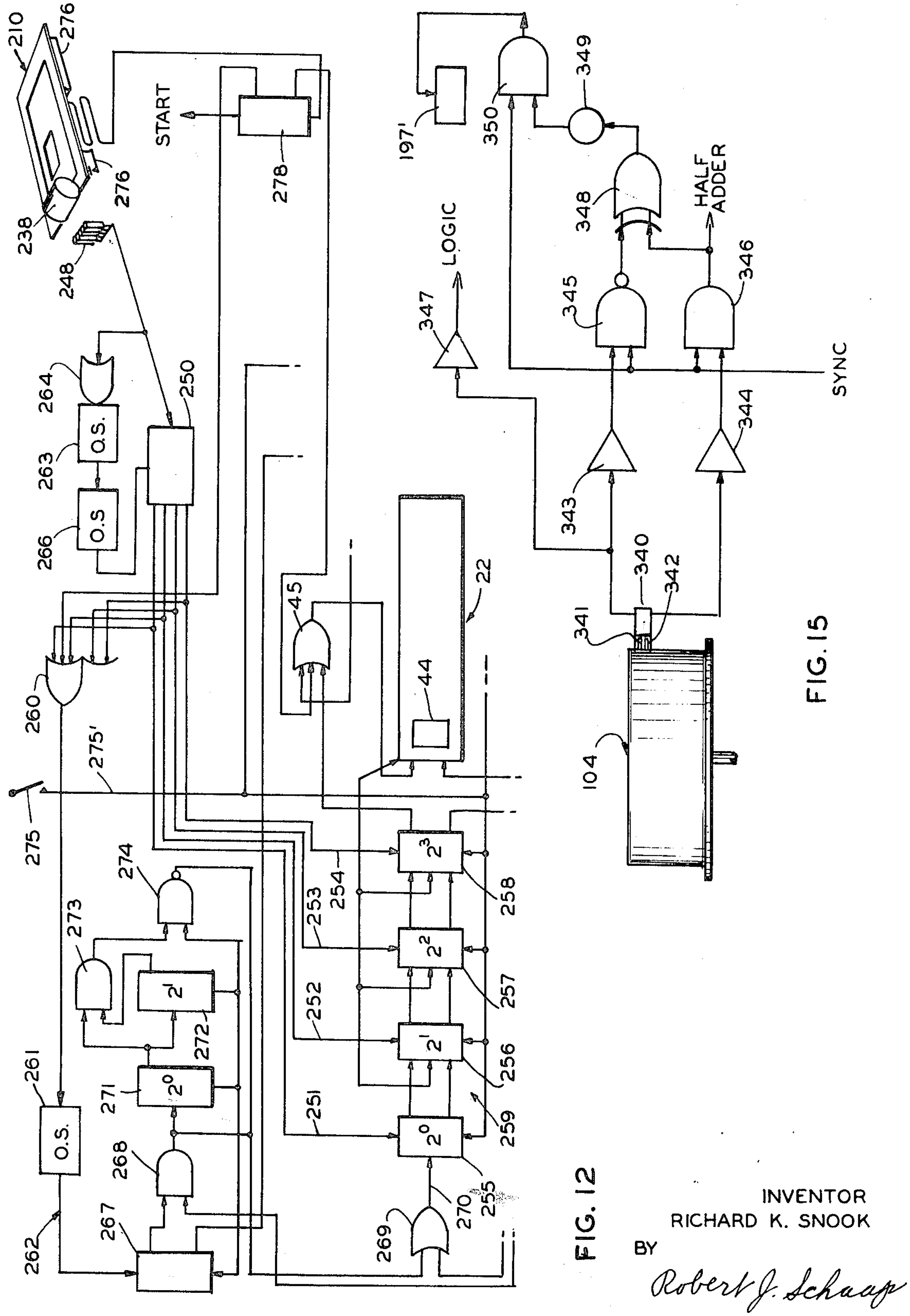
FIG. 12 is a schematic logic diagram illustrating the electrical circuitry forming part of the apparatus of FIG. 9.
FIG. 15 is a schematic logic diagram illustrating a circuit used with nonreturn-to-zero-mark data in the apparatus of the present invention.

It is also possible to employ two individual switches such as a clear switch and a start switch if desired. Furthermore, the switch 275 may be connected to the exciter lamp 245 for energization of the same upon commencement of operation. A switch actuator 276 in the form of a long bar is mounted on the underside of the tray 210 in the manner as illustrated in FIG. 12. The actuator 276 is designed to actuate a limit switch 277 enabling operation of the 4-bit counter 262 and the load gates 45, 46 when the tray 210 passes through the aperture 212 and into the housing 200. Upon entry of the tray 210 into the housing 200, the actuator 276 will enable card reading to take place. This function will occur as long as the actuator 276 holds the limit switch 277 in the closed position. On the return movement out of the housing, the switch 277 will not be actuated by the actuator 276. Furthermore, the lamp 255 will be energized when the credit card is moved in only one direction.

The limit switch 277 is connected to the source of electrical current (not shown) and to the reset position of a reader initiation flip-flop 278. The set position of the flip-flop 278 is connected to the start switch 275. The Q output of the flip-flop 278 is connected to the OR gate 260 and the $\overline{Q}$ output of the flip-flop 278 is connected to the load gate 45. Thus, when the start switch 275 is actuated, it will set the flip-flop 278 and the limit switch 277 will reset the flip-flop 278. Accordingly when the start switch 275 enables the 4-bit counter 262 and the associated elements, the flip-flop 278 will prevent enabling of the shift register. It should be recognized that the start switch 275 could be completely eliminated by employing a limit switch (not shown) located to be actuated by the card reader 210 when the latter is actuated. This latter limit switch will then serve the function of the clear start switch 275.

Figure 11:
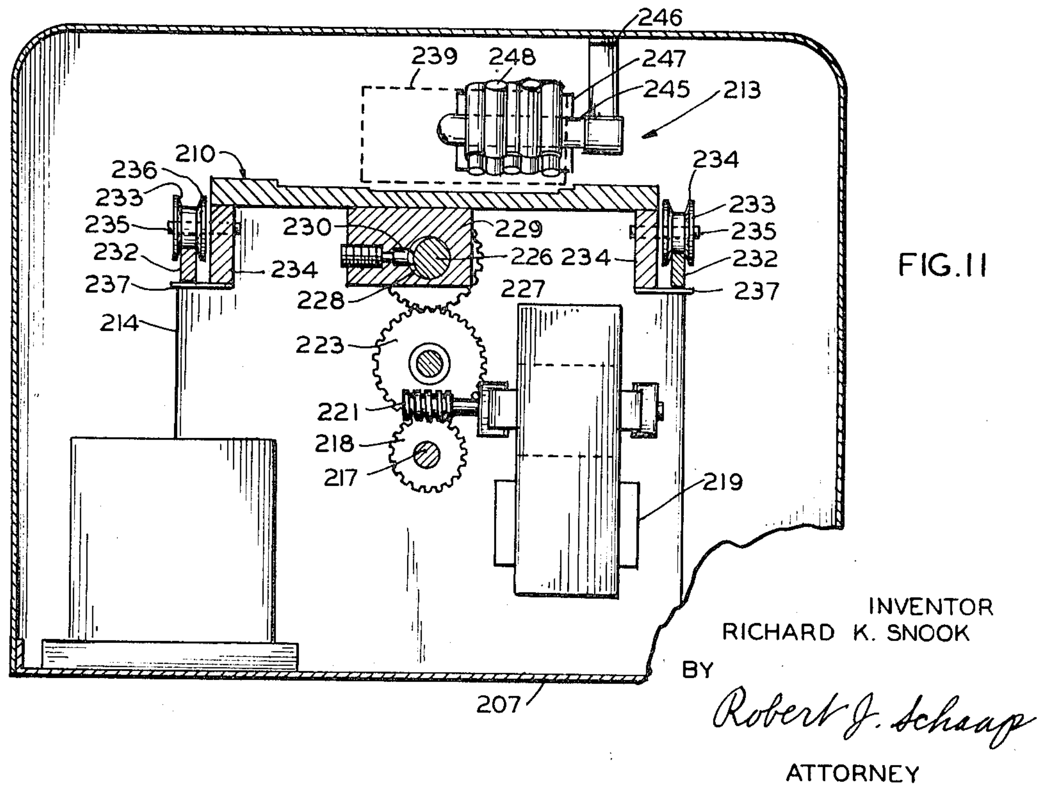
FIG. 11 is a vertical sectional view, partially broken away, taken along line 11—11 of FIG. 10.

In actual construction, the components forming part of the electrical of the apparatus A' as illustrated in the logic diagram of FIG. 12 are made by printed circuits in the form of printed circuit boards and are so illustrated in FIG. 11.

The remaining components in the apparatus A' are substantially identical to the corresponding components in the apparatus A. By reference to FIG. 12, it can be seen that the tape reading circuit and the comparison circuit and read error circuit in the apparatus A' is the same as in the apparatus A.

OPERATION OF THE AUTOMATIC CARD READER AND VERIFIER

The method of comparing the credit card number of a particular credit card with the stored list of invalid numbers is similar in both of the apparatus described and illustrated herein. In the apparatus A, the 10 decimal digits were entered in the form of 40-bit binary decimal code through the keyboard 8, where actuation of each key 9 generated four bits.

In the apparatus A' the bar code number of the credit card to be investigated is scanned by the optical scanning mechanism 213. The credit card to be investigated is placed on the card retaining tray 210 and is properly aligned with the indexing margins thereon. The operator will then actuate the clear start switch 275 which will simultaneously energize the motor 100 causing rotation of the drum 104 and will reset the error flip-flop 197', if the latter should be in the set condition. In addition, each of the flip-flops in the jam register 259, the flip-flops in the recirculating register 22 and the bad-card flip-flop 53 will be reset. The bad card light 54 will also be deenergized. This action will also break any latching action in the latching circuit. In essence, the actuation of the start clear switch 275 will reset the entire apparatus A' for comparison of the credit card to be examined.

Simultaneously with the energization of the motor 100, the motor 219 of the card reading mechanism 211 is also energized. Energization of the motor 100 will rotate the drive shaft 226 through the action of the gearing system previously described and illustrated in FIGS. 10 and 11. As the drive shaft 226 is rotated, the drive block 229 which is initially located at its forwardmost position, reference being made to FIG. 10, will begin to shift rearwardly. The drive block 229 will move through the action of the follower 230 riding in the spiral grooves 228 and the circular end grooves 231. The card retaining tray 210 will pass through the intake aperture 212 and between the rollers 238, 239.

If it is desired to record the card bearing information on an invoice slip then the invoice slip can be disposed in facewise engagement on the card at the initiation of the operation. The invoice card will also be properly aligned and indexed with the credit card. When the card and registered invoice pass between the rollers 239, 29 the information on the card will be transferred to the invoice slip in the manner previously described.

Continued rotation of the drive shaft 226 will cause the credit card to be passed beneath the optical scanning mechanism 213 for reading of the bar code. However, it should be recognized that the time delay between the actuation of the start-clear switch 275 and initiation of reading by the scanning mechanism 213 is sufficiently long to permit each of the components in the apparatus A' to be reset.

The lamp 245 may be conventionally actuated by means of limit switches so located that the lamp 245 will be energized immediately prior to the passing of the credit card beneath the prism 240. In addition, a second limit switch may be so located to deenergize the light 245 after the card has passed completely beneath the prism 240 and before it again passes therebeneath on the return to the initial card position. The light beams will pass through the prism 240 and are directed through the emitter 244 onto the credit card. The prism 240 may be suitably housed and properly apertured at the emitter 244 in order to pass light only in the area of the bar code appearing on the credit card.

The light sensitive photocells 248 will initiate voltage signals upon the sensing of the elements of the bar code on the credit card as a result of the two light levels equivalent to a logical "-zero" and a logical "one." The settling time circuit 263 will delay the transference of the information read by the photocells 248 in order to obviate any problem of card misalignment. The one-shot 265 will create the transference delay and the one-shot 266 will provide a settling time to insure the normalization of all data.

The informational bits generated by the optical scanning mechanism 213 will be in the form of a "two out of five code," which is converted to a 4-bit BCD code through the conversion matrix 250. The converted data in the form of the 4-bit code is then transferred to the jam register and one bit is inserted into each of the flip-flops 255–258. The one-shot 261 provides a shift delay and enables stabilization and insurance that the pulses have been jammed into the jam register 259. The clock pulses from the sync bus 37 will be transmitted to the shift gate 269. When the receiver flip-flop 267 has been set, sync pulses from the sync head 36 will enter the 4-bit counter 262, and through the shift gate 269, precess the data from the jam register 259 into the shift recirculating register 22.

The two counters 271, 272 in the 4-bit counter 262 operate in a manner similar to the two counters 38, 41 in the 4-bit counter 33. However, at the down clock of the third pulse, the sum gate 273 will be opened and the fourth pulse will be gated with the sum output, thus generating four shift pulses. At the down clock of the fourth pulse, the two counters 271, 272 and the receiver flip-flop 267 are reset. The continued shifting of the four bits of information in the jam register 259 into the shift register 22 will clear the flip-flops 255–258 for four more bits of information. This process will continue until 40 pulses representing the entire bar code have been inserted into the shift register 20.

Since the drum 104 is rotating, the sync head 164 will continually read sync pulses from the sync track of the tape 112. However, at this point, the head position gate 188 will still be inhibited and nothing further will happen with the reading of the sync pulses. Another suitably positioned limit switch will prevent the head escapement mechanism 114 from shifting the data head 124 to the reading position until all of the information has been read from the credit card and transferred into the shift register 20. After all of the information has been read and jammed into the shift register 20, the head escapement mechanism will be enabled and cause the data head 124 to shift into engagement with the first information track on the tape 112. When the data head 124 is suitably positioned in the reading position, it will read logic pulses and information pulses. At this point, the remainder of the apparatus A′ is similar to the apparatus A and will function in like manner.

MODIFIED SHIFT REGISTER

The present invention also provides a modified form of shift register 300 which can be used with either the credit card verifier A, A′ or the verifier A″ hereinafter described. This shift register 300, which is more fully illustrated in FIG. 13, employs a recirculating register 301 similar to the recirculating register 22 and contains a plurality of flip-flops 302. In the event that the apparatus is designed to verify a 10 decimal digit number or word, in the manner as previously illustrated and described, then the recirculating register 301 would contain 40 flip-flops 302.

Figure 13:
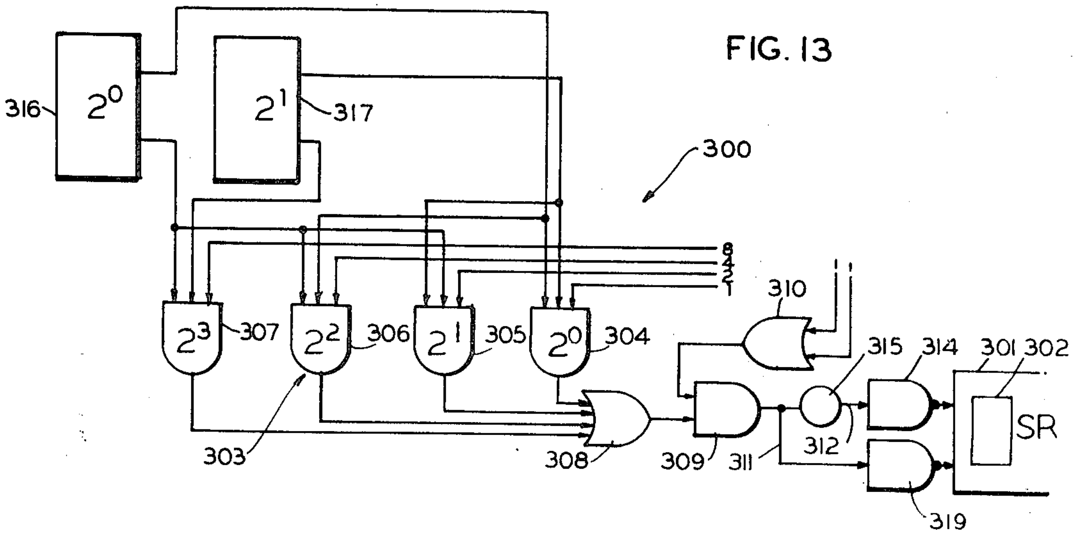
FIG. 13 is a schematic logic diagram illustrating an AND gate matrix and modified form of bit counter which can be substituted for the entrance register in FIG. 8.

The shift register 300, however, does not employ a jam or entrance register, but rather, employs an AND gate matrix 303. The bit line 14 is connected to a first AND gate 304 which is labeled $2^0$; the bit line 15 is connected to a second AND gate 305, which is labeled $2^1$; the bit line 16 is connected to a third AND gate 306 which is labeled $2^2$; and the bit line 17 is connected to a fourth AND gate 307 which is labeled $2^3$. The outputs of each of the gates 304, 305, 306 and 307 are connected to the inputs of an OR gate 308, the output of which is, in turn, connected to one input of an AND gate 309 which serves as a narrow clock gate. The other input to the narrow clock gate 309 is connected to a shift gate 310 which is in turn connected to the 4-bit counter and to the source of shift pulses in the manner as previously described. The output of the narrow clock gate 309 is connected to a pair of input lines 311, 312 which are connected to load gates 313, 314 respectively. The load gates 313, 314 are in turn, connected to the "J" and "K" inputs of the first flip-flop 302 in the recirculating register 301. An inverter 315 is interposed in the input line 312 in the manner as illustrated in FIG. 13.

This type of shift register 300 presents some advantages over the previously described shift registers in that it is possible to employ gates in place of flip-flops and thereby simplifies the cost and construction of the jam register. The 4-bit counter employed is substantially similar to the previously described 4-bit counter and contains two counters 316, 317 which are labeled $2^0$ and $2^1$ respectively. The Q output of the counter 316 is connected to the gates 304, 306 and the $\bar{Q}$ output thereof is connected to the gates 305, 306, 307. In like manner, the Q output of the counter 317 is connected to the gates 304, 305 and the $\bar{Q}$ output is connected to the gate 307. This type of shift register input enables the employment of a smaller parity circuit which includes only a pair of flip-flops and does not require the use of an exclusive OR circuit.

Where a two section shift register is employed, the data is entered in parallel into the jam register and shifted serially into the recirculating register. The data is actually metered out four bits at a time. With this embodiment of the shift register 300, the four bits are located in their proper position in the recirculating register 301 by the gating of the shift pulses. This shift register operates on a temporal relation whereas the former shift registers operated on a position relation.

This type of shift register must operate on the assumption that the operator holds the key 9 for a sufficiently long time to enable four counting pulses to be metered from the 4-bit counter. However, this assumption is practically obviated inasmuch as four counting pulses are metered at a rate which is materially faster than any operator could actuate any key 9. It is also possible to use the pulse dispensing circuit including one-shots 261, 262 in order to perform this metering function.

PARITY CIRCUIT

Figure 14:
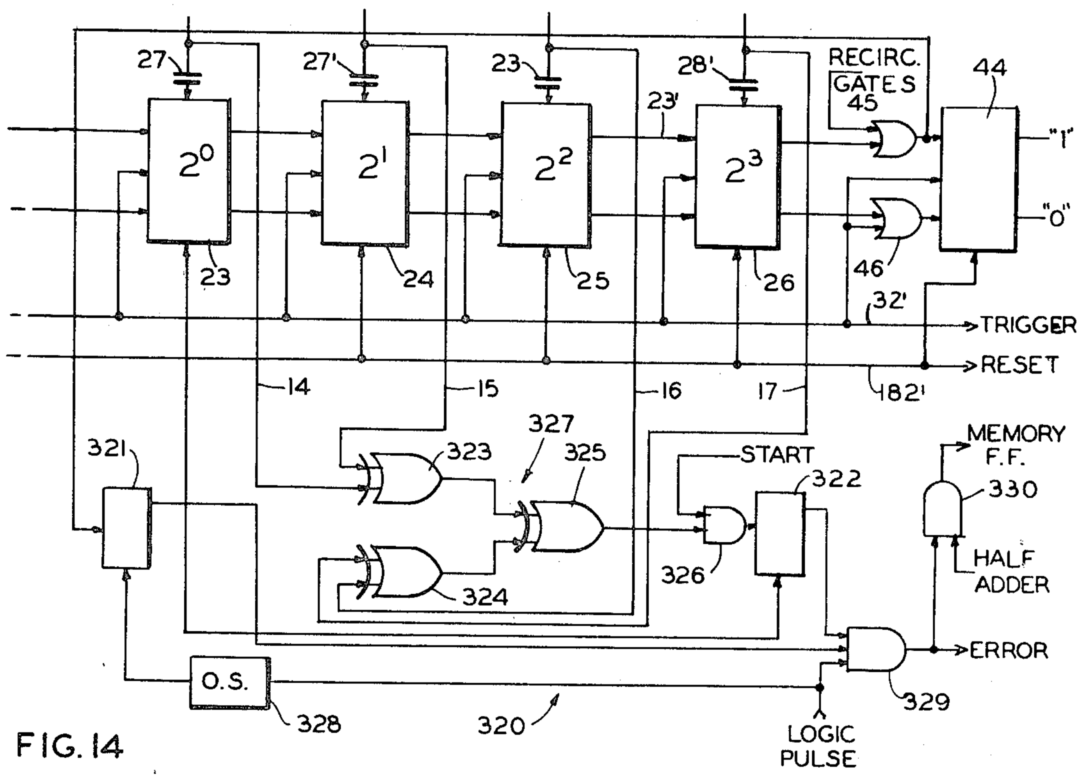
FIG. 14 is a schematic logic diagram illustrating a parity circuit which can be optionally used with the apparatus of the present invention.

A parity circuit 320 which is more fully illustrated in FIG. 14, may be employed with either of the apparatus A or A′ of the present invention. The input of a decimal digit can be used to generate a parity bit which can be tested over the entire set for an even or odd sum. The odd or even number of bits in the shift register can be examined to determine if any bits were gained or lost.

The parity circuit 320 generally comprises a flip-flop 321 which serves as a first counter and which has its trigger input connected to the input of the first flip-flop 44 in the recirculating register 22. The parity circuit 320 also includes a second flip-flop 322 which serves as a second counter and which has its reset input connected to the reset bus 183. The bit lines 14, 15 connected to each of the flip-flops 23,24 are also connected to the two inputs of a first exclusive OR gate 323, and the bit lines 16, 17 connected to each of the flip-flops 25, 26 of the jam register 21 are connected to the two inputs of a second exclusive OR gate 324. The outputs of the two exclusive OR gates 323, 324 are connected to the two inputs of a third exclusive OR gate 325, the output of which is connected to an AND gate 326. The other input of the AND gate is connected to the start switch 181 and the output of the AND gate 326 is connected to the trigger input of the second counter 322. The three exclusive OR gates 323, 324, 325 form an exclusive OR circuit 325.

The reset input of the first counter 301 is connected to a one-shot 328 which is, in turn, connected to the output of the head position gate 188 to pick up logic pulses. Furthermore, the outputs of the two flip-flops 321, 322 are gated with the logic pulse input at an AND gate 329.

The output of the AND gate 329 is connected to one input of a parity gate 330. The other input of the parity gate 330 is connected to the output of the half adder 50 and the output of the parity gate 330 is connected to the reset input of the memory flip-flop 52. It can be seen that if the optional parity circuit 320 is not employed, the parity gate 330 is not used and the half adder output 50 would be connected directly to the reset input of the memory flip-flop 52. In addition, the output of the AND gate 329 is connected directly to the OR gate 197 and the error flip-flop 197'.

The parity circuit 320 is designed to count the number of informational bits passing into the shift register and will examine for an odd or even number of binary "one's." If the parity circuit counts an odd number of binary "one's" then the sum will be odd. If the parity circuit 320 counts an even number of "one's," then the sum will be even. The binary "one's" in parallel groups of four which are present in the input bus 23' are counted by the exclusive OR circuit 327. The following relationships will hold at the counter 302:

$$\underline{(1\oplus 2)=(1\cdot\bar{2})+(\bar{1}\cdot 2)=1\oplus 2} \text{ and}$$

if there was an odd number of "one's" in the temporal input during which the parity examination is being made, then $$(1\oplus 2)\oplus\underline{(4\oplus 8)}=1;$$

if there was an even number of "one's" in the temporal input during which the parity examination is being made, then $$\underline{(1\oplus 2)\oplus(4\oplus 8)=0.}$$

In each of the above equations, the symbol $\oplus$ represents exclusively OR. From the above, it can be seen that the sum of the digits during recirculation should always remain the same. The second counter 322 will keep track of every pulse jammed into the jam register 21 and shifted to the recirculating register 22. This count of pulses will remain in the second counter 302 until the next reset pulse which will occur on the actuation of the clear switch 182. In essence, the counter 322 counts the number of binary "one's" that are transferred out of the jam register 21 into the recirculating shift register 22. If the counter 322 detects an odd number of pulses, it will be in the set condition, and if it counts an even number of pulses, it will be in the reset condition.

The counter 321 will count the number of recirculated pulses and will change state upon detection of each pulse which passes through the recirculation gates 48,49. At the end of each recirculation period, the counters 321,322 should be in the same state.

The exclusive OR circuit 327 is only designed to examine data entered into the four flip-flops 23–26 of the jam register 21. This circuit 327 provides an automatic counting function and keeps track of the number of "one's" passing into the jam register 21 from the keyboard 8 and into the recirculating register 22. The four input conditions resulting from the actuation of one key 9 is anded with the four shift pulses.

The logic pulse is anded with the outputs of each of the counters 321,322 to make a comparison at logic pulse time. If the contents of both of the counters 321,322 are the same at the comparison time, no actual output will exist and accordingly, no error exists. If the contents of the counters 321,322 are different at the comparison time, the output difference will generate an error signal at the error flip-flop 197' causing energization of the error light 198. This error signal will also deenergize the apparatus. Inasmuch as the logic pulse is used to reset the first counter 321, comparison of the counter contents at logic pulse time would tend to reset the counter 321 simultaneously. The one-shot 328 provides a sufficient time delay after the comparison to reset the counter 321.

While the parity circuit 320 has been described in use with the apparatus A, it should be recognized that the circuit 320 could be used with the apparatus A' and would be connected thereto in like manner.

PULSE RECORDED MODE OF OPERATION

It is possible to provide a modified form of credit card verifier A'' which is more fully illustrated in schematic form in FIG. 15. The credit card verifier A'' is substantially similar to the verifiers A and A', except that it provides a pulse recorded tape, that is a tape with digital recorded data. The verifier A'' therefore employs a modified form of tape reading system. The tape reading system can be used with either of the verifiers A or A'.

In the verifier A'', a sync head 164 is employed and the sync head 164 will normally engage the first or sync track of the tape 112 and will read the sync signals. The tape 112 is also removably mounted on the drum 104 which is rotatable upon energization in the manner as previously described. A head cartridge 340 is mounted on the head supporting frame 121 and is movable therewith into and out of reading position. The head cartridge 340 carries a pair of spaced aligned data heads 341,342 which are designed to simultaneously read a pair of adjacent data tracks on the tape 112. Each cam pulse will actuate the head escapement mechanism 114 to shift the frame 121 to the next pair of adjacent tracks, until all of the tracks on the tape 112 have been read.

In the analog recorded mode of operation having FSK recording heretofore employed in the apparatus A and A', the recording has an inherent redundancy. Accordingly, a loss of one flux transition did not materially affect the reading process. The actual techniques employed in recording the tape is described hereinafter in more detail. However, in the digital recorded mode of operation, it is necessary to account for a loss of a flux transition, since in normal digital recording techniques, loss of one flux transition will materially interfere with tape reading. The apparatus A employs a tape 112 which is recorded with "nonreturn to zero mark" (NRZM) data and the same data is recorded on two adjacent tracks. This type of recording produces a 100 percent redundancy of the data on the tape.

When the heads 341,342 read data on individual tracks, they should both read identical data. In this type of data input, pulses are recorded on the tape rather than the frequencies used in the apparatus A and A'. The heads 341,342 are each connected to amplifiers 343,344 respectively. The amplifier 343 is connected to a NAND gate 345 which has one input connected to the sync bus 37 for picking up sync pulses. The amplifier 344 is connected to an AND gate 346 which has one input connected to the sync bus 37 for picking up sync pulses. The amplifier 323 is also connected to a filter 347 which replaces the filter 190 and which, in turn, provides a source of logic pulses. The filter 347 can be connected to a logic pulse gate in the same manner as in the apparatus A or A'.

In the pulse recorded mode of operation, it is desirable to simultaneously compare information on two adjacent tracks for continuity. Using dual recording and reading techniques it is possible to determine if there was a loss of any informational bit. If the loss of an informational bit is detected, then the word which originally contained that informational bit cannot be used Each of the gates 345,346 are connected to the sync bus 37 to compare the readings of the two tracks at sync time.

The outputs of the gates 345,346 are connected to the two inputs of an exclusive OR gate 348, the output of which is connected to an inverter 349. The inverter 349 is connected to an AND gate 350 which also has one input connected to the sync bus 37 for picking up sync pulses. The output of the AND gate 346 is connected to the error flip-flop 197'. The output of the gate 346 is connected to the half adder 50 for comparison of the read data with the recirculating data in the shift register 20. The reminder of the structure in the apparatus A'' is substantially similar to that in either of the apparatus A or A'. It is preferable, however, to employ a read error circuit and a parity circuit in the apparatus A''.

In the pulse recorded mode of operation, the filter 347 is an amplifying filter and only serves to provide logic pulses. At the output of the gates 345,346 a 1 and 1' output are obtained. Upon inversion, a 1 and $\bar{1}'$ output is obtained. These two outputs are gated at sync time in the gate 350 for comparison at sync time. If a pulse is detected at the gate 346, a pulse will not appear at the gate 345. If a 1 and $\bar{1}'$ are detected, then the two outputs are the same. If the pulse at the gate 346 exists it is a 1, and if no pulse exists at the gate 346 then it is a representation of a 0 condition, due to the inversion. The opposite of these conditions would hold at the gate 345.

If at any time in the reading process, there is a lack equivalence at the output of the amplifiers 343,344, at sync pulse time, then an error has occurred in the reading process. For example if neither a 1 and $\bar{1}'$ nor a 0 and a $\bar{0}'$ exists at the gate 348, then an error has occurred in the reading process. If this condition does not exist at the gate 350 at sync pulse time, then the gate 350 will enable the actuation of the error flip-flop 197'. In essence, as long as the same information is detected by each of the heads 341, 342 no error exists and, therefore, the error flip-flop 197' will not be actuated. However, if the same information is not read by each of the heads 341,342 then an error exists and the error flip-flop 197' will be actuated for energization of the error light 198. The following table will illustrate the logical output of each of the pertinent elements (as represented by their reference numerals) in the error detection system: 142

| 343 | 344 | 345 | 346 | 348 | 349 | 350 |
|---|---|---|---|---|---|---|
| 0 | 0' | 1' | 0 | 1 | 0 | 0 |
| 1 | 0' | 0' | 0 | 0 | 1 | 1 |
| 0 | 1' | 1' | 1 | | 1 | 1 |
| 1 | 1' | 0' | 1 | 1 | 0 | 0 |

It can be seen that when there is a lack of equivalence at the outputs of amplifiers 343, 344, the gate 350 will cause the error flip-flop to be set. In this connection, it should be recognized that if an error is detected by either the parity circuit 300 or the read error circuit 195, then the error flip-flop 197' will also be actuated and the error light 198 will be energized. In addition, if an error is detected in the redundant reading by the heads 341,342, the bad card flip-flop 53 will be inhibited. Thereafter, the memory flip-flop 52 is reset upon the next logic pulse.

In the pulse recorded mode of operation, the logic pulse may be in the form of a sine wave burst as in the previous embodiment which is recorded on the data tracks. However, the logic pulse may also be recorded on the sync track.

MODIFIED DATA STORAGE MECHANISM

The present invention also provides a modified form of data storage mechanism 400 which is more fully illustrated 'in FIGS. 16–21. In the data storage mechanism of the credit card verifiers heretofore described, the data reading head was sequentially stepped past a rotating drum which was positionally fixed in an axial direction with respect to the drum. The present modified form of data storage mechanism 400 provides a means for sequentially shifting a drum past a fixed data head.

The data storage mechanism 400 generally comprises a pair of longitudinally spaced upstanding bearing blocks 401,402 which are mounted on the baseplate 6 of the housing 1. Journaled in the blocks for rotative and longitudinally shifting movement is a drum shaft 403. Removably mounted on one end of the shaft is a data storage drum 404 which is substantially similar to the drum 104 and may be provided with pins (not shown) for holding a data storage tape 406. The drum 404 is provided with a central aperture 407 for concentric disposition on the shaft 403 and is also provided with a splined section or keyway 408 for inhibiting rotational movement with respect to the shaft 403.

The drum 404 may be constructed from the same material as the drum 104 and may be fabricated in like manner. The tape 406 is also substantially similar to the tape 112 and may be provided with a resilient backing, if desired. Furthermore, at the margins of joinder to the drum 404, the tape 406 may be provided with a small cleaning pad 409 extending the transverse distance of the tape for cleaning the data head. This type of construction enables the periodic replacement of drums with the tapes presecured thereto, and thereby avoids the necessity of the operator periodically changing the tapes on a fixed drum. Furthermore, it should be recognized that it is possible to record directly on a drum magnetic surface and thereby obviate the need of magnetic tapes. However, under present day recording techniques it may be preferable to record on the tape and adhesively secure the tape to the drum, before shipping to the ultimate users of the apparatus. If the tape is adhesively secured to the drum prior to shipping to the user of the apparatus, the pins normally employed on the drum may be eliminated.

The drum 404 is inserted on the end of the shaft 403 and bears against an indexing washer 410 which will positionally locate the drum 404 on the shaft 403. A spring clip 411 is also mounted on the left transverse end of the drum shaft 403, reference being made to FIG. 16, for removably retaining the drum 404 thereon.

Figures 16, 17:
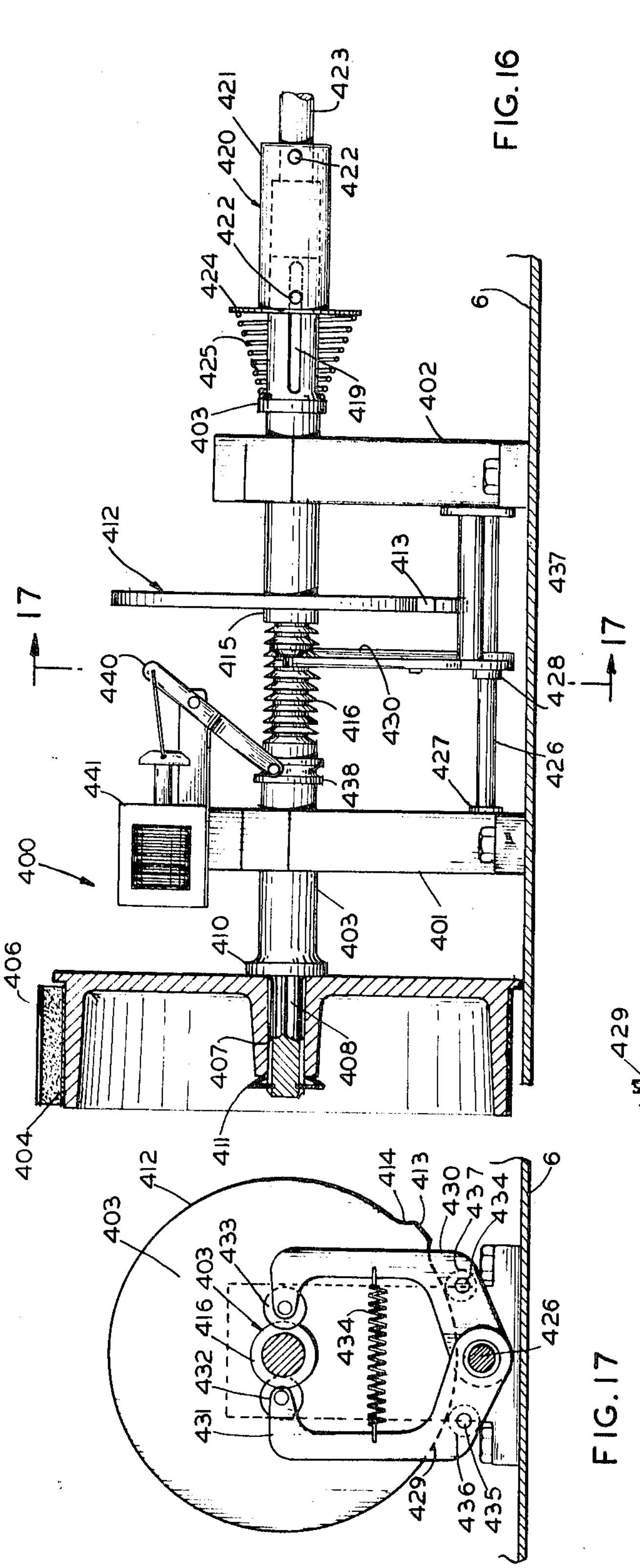
FIG. 16 is a vertical sectional view showing a modified form of escapement mechanism used in the apparatus of the present invention for shifting a drum relative to a reading head.
FIG. 17 is a vertical sectional view taken along line 17—17 of FIG. 16.
Figure 18:
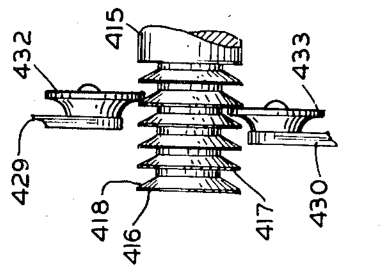
FIGS. 18, 19, 20 and 21 are side elevational views showing the various positions of escapement cams and escapement discs forming part of the mechanism of FIG. 16, and showing the positional relationships of these components for enabling operation of such mechanism.
Figure 19:
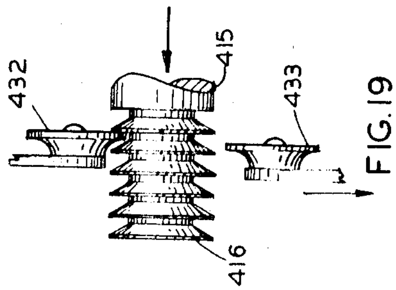
Figure 20:
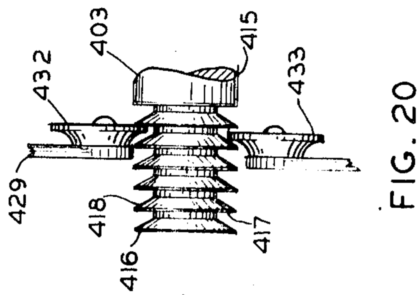
Figure 21:
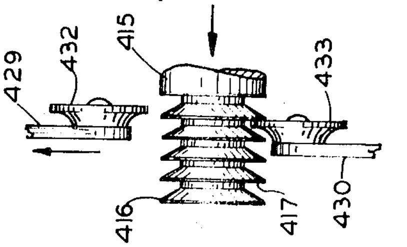

Also mounted on the shaft 403 and being located between the two bearing blocks 401,402 is an actuating cam 412 having a cam surface 413 with a protruding shoulder 414. Disposed against the left end wall of the cam 412 is a diametrically reduced hub 415. Also concentrically disposed about the drum shaft 403 are a plurality of concentrically aligned escapement discs 416 which have the same diametral size as the hub 415. The escapement discs 416 are conically shaped as illustrated in FIG. 16 and have relatively flat left end walls 417 and opposed tapered right end walls 418 which serve as camming surfaces. The number of escapement discs 416 equal to the number of sequential shifting movements desired for the drum 404.

The shaft 403 is also provided with an elongated slot 419 and concentrically disposed about the shaft 403 is a sliding spline joint 420 in the form of a sleeve 421 having a pin 422 movable in the slot 419. Rigidly secured to the right end of the sleeve 421 by means of setscrews 422 is a drive shaft 423 which is secured to and operable by the motor 100. Thus, the drum shaft 403 is rotated through the action of the spline joint 420 and is axially shiftable with respect to the spline joint 420. A washer 424 is secured to the drive shaft 423 and interposed between the washer 424 and the left end wall of the sleeve 420 is a compression spring 425 which biases the drum shaft 403 to the left.

Also journaled in the bearing blocks 401,402 is a support rod 426 which is provided with a pair of positioning washer 427 which, in turn, bear against the bearing blocks 401,402. Pivotally mounted on the support rod 426 and being held in place by means of a pair of locking nuts 428 are a pair of escapement arms 429,430. The arms 429,430 are somewhat U-shaped and are integrally provided with inwardly struck flanges 431 for retaining escapement rollers 432,433, respectively. A tension spring 434 extending between the two arms 429,430 biases the escapement rollers 431,432 into engagement with the escapement discs 416. The arms 429,430 are slightly offset with respect to each other so that one roller 431 is longitudinally spaced for slight distance with respect to the roller 432. Also mounted on the arms 429,430 are a pair of extended stub shafts 435, which carry cam followers 436,437, respectively. By reference to FIG. 16, it can be seen that the cam followers 436,437 extend forwardly of the escapement rollers 432,433.

Each complete 360° rotation of the drive shaft 423 will cause the drum shaft 403 and the drum 404 to make a complete revolution. Furthermore, the cam 412 will make a complete revolution therewith. Each revolution of the cam 412 will cause the protruding shoulder 414 to engage the cam follower 436 biasing the arm 429 outwardly and disengaging the escapement roller 432 from the flat end wall 417 of the escapement disc 416. This action will enable the shaft 403 to shift axially for a short distance until the disc 416 which was engaged by the roller 431 becomes engaged by the roller 432. Continued rotation of the cam 412 will cause the shoulder 414 to engage the cam follower 437 and urge the escapement arm 430 outwardly. The escapement roller 433 will become disengaged with the same escapement disc 416. As this occurs, the tension spring 419 will urge the drum shaft 403 to the left causing the drum 404 to shift to the left. However since the protruding shoulder 414 is no longer in engagement with the cam follower 436, the arm 429 will swing inwardly due to the action of the spring 434. The escapement roller 432 will then be in position to engage the flat end wall 417 of the next adjacent escapement disc 416. Thereafter, the shoulder 414 will rotate out of engagement with the cam follower 437 permitting the arm 430 to swing inwardly and enable the escapement roller 433 to swing inwardly.

Thus, it can be seen that the drum shaft 403 is axially shifted for the distance between two escapement cams 416 for each revolution of the cam 412. This same cycle is repeated for each complete rotation of the cam 412, until the cam followers 432,433 engage the hub 415. The operation showing this advancement sequence is more fully illustrated in the sequential drawings of FIGS. 18–21.

A reset bearing 438 having a pair of enlarged peripheral flanges 439 is also concentrically disposed on the shaft 403 for resetting the shaft 403 to its initial position, that is to cause the shaft 403 to shift to its extreme right position. A fork 440 actuable by a solenoid 441 is engageable with the bearing 438 and will shift the same to the right until the escapement rollers 432,433 engage a peripheral flange 439 of the bearing 438. It can be seen that the escapement rollers 432,433 will be biased out of engagement with the escapement discs 416 during the resetting motion due to the action of the camming surfaces 418.

When the data storage mechanism 400 is employed, the head escapement mechanism previously described is not employed The data head is conventionally fixed so that it is located in registration with each track on the tape 406 for each consecutive movement of the drum 404. If a separate sync track is used on the tape 404, then the sync head could be operatively connected to the drum shaft 403 for nonrotational movement. The remaining components used in the data storage mechanism 400 are substantially identical to the components used in the data storage section H.

It should be recognized that the modified data storage mechanism 400 could be used in the apparatus A′ or the apparatus A″ as well, even though its operation has been described in connection with the apparatus A.

PROCESS

The process embodied in the credit card verifiers of the present invention is actually set forth in the description of each of the apparatus and in the operation thereof. However, the process of the present invention can best be understood by initial reference to FIG. 22 which schematically illustrated the various steps taking place. In this figure, the rectangular blocks represent a function which occurs or an action which takes place; the circular blocks represent an action which takes place or occurs in a period of time; and the diamond shaped blocks represent a decision-making element, either a human decision, or a decision made automatically by the apparatus.

When the operator or the apparatus is presented with a credit card having an identification number for comparison, he initially presses the clear button. This action will immediately initiate four simultaneously occurring individual action. Pressing of the clear button will energize the motor causing rotation of the drum and the data storage tape mounted thereon. The synchronizing head is shifted into engagement with the tape. The invalid card lamp or valid card lamp is deenergized. Finally the jam register and recirculating register are cleared of any information contained therein.

At this point, the decimal digit information on the credit card for comparison is ready to be entered into the shift register. For the purposes of understanding the operation of the apparatus of the invention, the specific manner in which the information may be entered is not a matter of concern. The information may be entered either by actuation of the various keys in the apparatus A or by reading of the bar code in the apparatus A′. As a decimal digit is entered in the form of four bits, recirculation is inhibited. As the first decimal digit is entered, the 4-bit counter is actuated. The first four bits of information representing the first decimal digit is then shifted four places to the right in the shift register to the next four flipflops.

The decision of whether or not this is the last decimal digit must then be made. This decision can be made by the operator who actuates the various keys while mechanically entering the information into the apparatus. This decision can be automated in the apparatus A by providing a conventional counter. In the apparatus A′, this decision is made automatically. Obviously, if it is not the last decimal digit, the next decimal digit will be entered and the three preceding actions will again take place. At all times, during entrance of this information, recirculation will be inhibited in the recirculating register.

If the last decimal digit decision is yes, the operation of comparison is started, by actuation of the start button. Actuation of the start button will simultaneously initiate two individual operations, namely shift the data head into engagement with the data storage tape and will also enable recirculation to take place in the shift register. The presence of the cam pulse will initiate the action to cause the data head to be shifted into the reading position.

The cam pulse, followed subsequently by a logic pulse, will enable the transfer of shift pulses. The presence of the shift pulses will cause the data in the shift register to be recirculated. In addition, it will enable the recirculated data to be compared with the data read by the data head.

At his point, a number of decision-making elements will function. If no cam pulse exists, a data bit will be added to the bit from the shift register. This will only be true in the event that no logic pulse exists. If a logic pulse does exist, a shift pulse will not be added to the shift register and a comparison will take place. If the comparison nets a logical "one," the bad card light will be energized and the operation will cease. If the comparison nets a logical "zero," additional shift pulses will be enabled.

If a yes decision is made regarding the existence of a cam pulse, then the data head is repositioned to the next adjacent track and a further shift is inhibited until the following logic pulse. A last track decision must then be made. If the decision is made that the head is positioned and has read the last track, the operation will stop. However, if the decision is such that the head has not read the last track, another cam pulse will be initiated. The initiation of another cam pulse together with another logic pulse will enable the generation of another series of shift pulses. The data bit is then added to the shift register bit and comparisons will take place in the manner described. This function will repeat itself until the final comparison has been made and the bad card lamp has been energized or until the apparatus is deenergized after reading the last data track.

Figure 22:
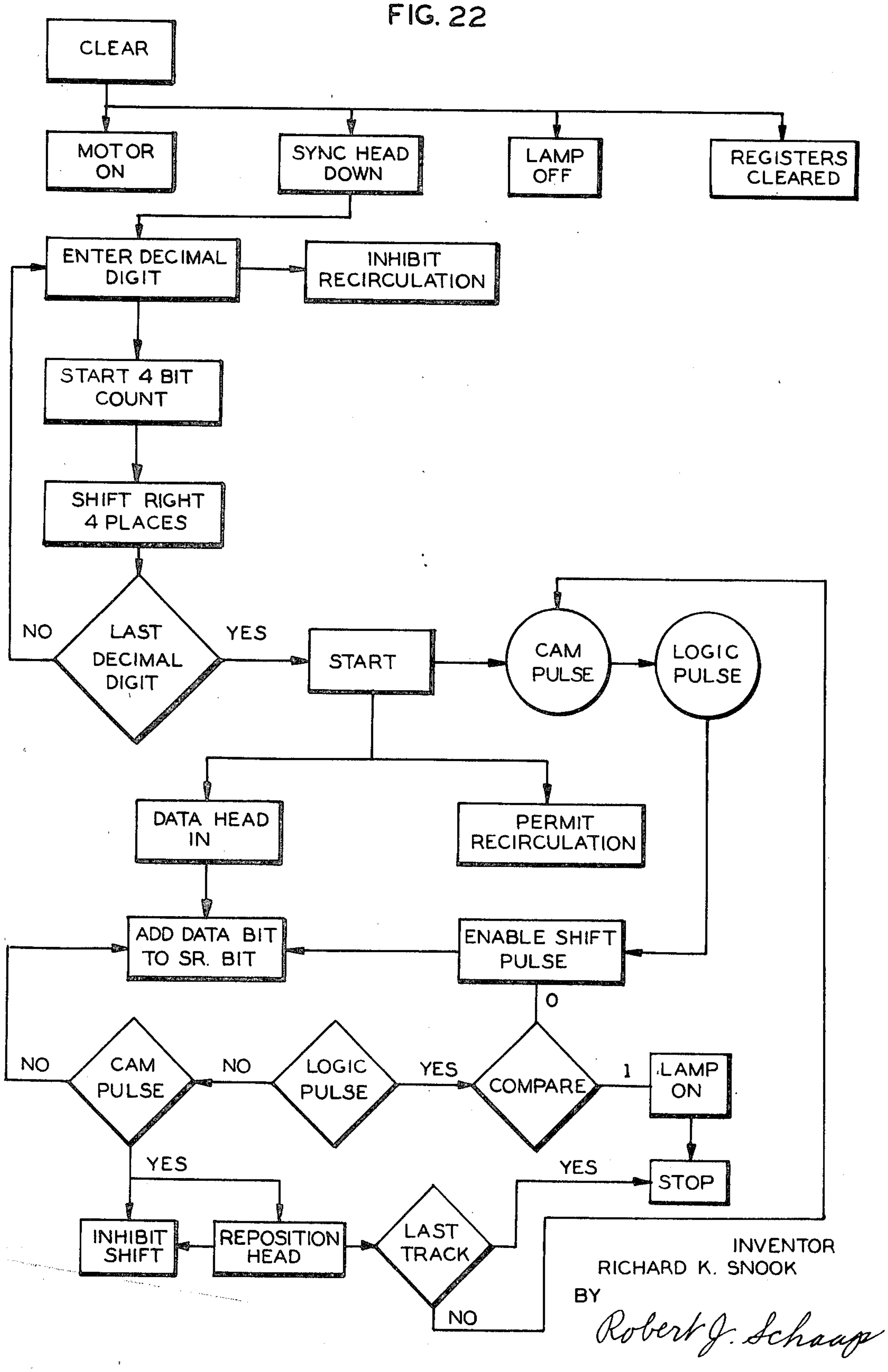
FIG. 22 is a schematic view of a flow diagram showing the steps in the process of verifying a credit card in accordance with the present invention.

It should be recognized that a read error checking function and a parity check could be added to the functional diagram illustrated in FIG. 22. In the event that a read error checking function were added, the output of the data head would be examined for error simultaneously with the adding of the data bit to the recirculated bit from the shift register. If neither a logical "one" nor a logical "zero" was to be added to the recirculated bit, the stop function would take place and the process terminated. In like manner, if both a logical "one" and a logical "zero" occurred simultaneously, the stop function would also take place.

If a parity circuit was employed, the contents of the shift register would be examined for an odd or even number of binary one's and advise if bits of information were gained or lost during the process. The parity examination would also take place before the data bit is added to the recirculated bit from the shift register. If a parity error is detected, then the stop function would take place and process terminated.

TAPE RECORDING

It can be seen that the credit card verifier apparatus of the present invention can be operated with digital recorded data or with analog recorded data. There are a number of digital formats available for tape recording such as the return to zero (RZ), return to bias (RB), nonreturn to zero space (NRZS), nonreturn to zero change (NRZC) and the nonreturn to zero mark (NRZM), the latter being used in the digital recorded data format employed herein. The NRZM format has been found to be most suitable of any digital format, since this type of format provides the most efficient and accurate form of recording and reading. In the digital format, the bit is represented by a single flux transition. The tape is recorded with a 100 percent redundancy since the loss of one flux transition could invalidate any reading.

There are also a number of analog formats available for tape recording such as pulse amplitude modulation (PAM), pulse width modulation (PWM), frequency modulation (FM), phase modulation (PM) and frequency shift keying (FSK), the latter being used in the analog recorded data format employed herein. The FSK format has been found to be most suitable of any analog format since this system has a minimum of ten cycles for each bit, thereby providing a great inherent redundancy. By using three different and distinct frequencies in recording, it is possible to represent the logic pulse, the "one" pulse and the "zero" pulse. In this type of recording, the rate of zero crossings per unit time is a matter of interest. A band containing these three frequencies is used and an envelope of these frequencies is obtained by using limiter strips. Center-slicing operations are performed until the recorded sine wave becomes a square wave with only zero crossings. Three filters are used in the apparatus as discriminators and detect the three recorded frequencies.

Figure 23:
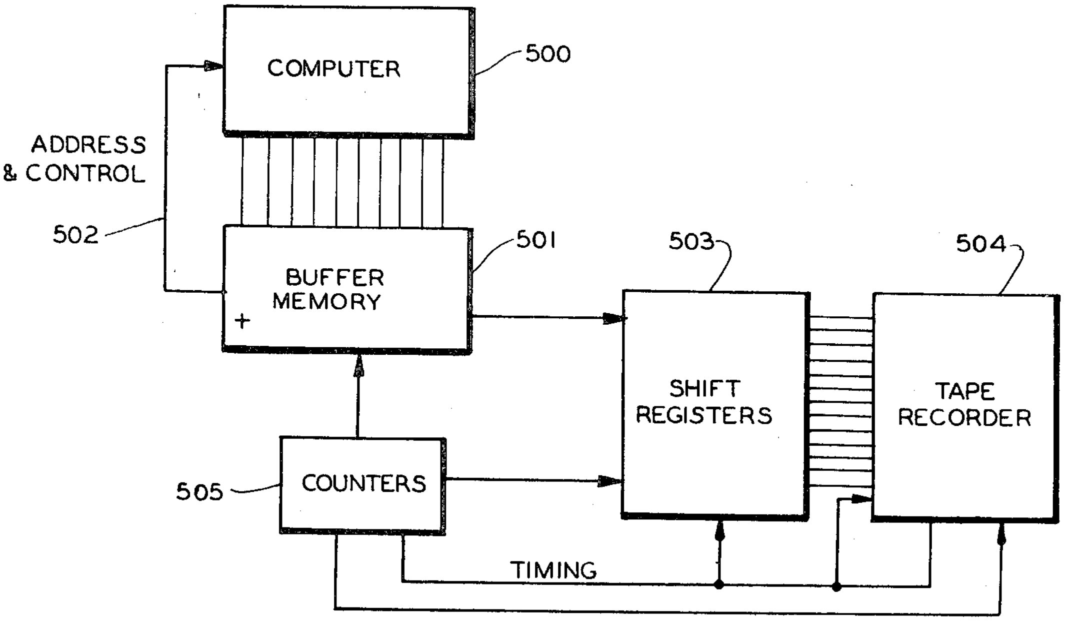
FIG. 23 is a diagrammatic view showing a mechanism for recording magnetic tapes used in the apparatus and process of the present invention.

The method and apparatus of recording the tape is more fully illustrated in FIG. 23 and generally comprises a conventional digital computer 500 having a magnetic storage. The computer 500 generally includes an output which is interfaced against a buffer memory 501. Due to the fact that the recording tape hereinafter described requires a longer time period than is required for the transference of information from the computer, a buffer memory 501 is employed in order to prevent consumption of expensive computer time. The computer will transfer all of the necessary information contained in the computer storage in parallel into the buffer memory 501, 40 lines at a time.

An address register normally located in the buffer memory is designed to keep track of the word source and identify its location in the buffer memory 501 when information is transferred out of the buffer memory 501 in a manner hereinafter described. Actually this is a sequential counting since the information contained in the buffer memory 501 is sequentially shifted out of the buffer memory 501. The mechanism for identifying the word location in the buffer memory 501 is represented by an address and control line 502 schematically illustrated in FIG. 23.

A shift register 503 for each data line to be recorded on the tape is also provided. Accordingly, if 13 lines of data are to be recorded on the tape, then 13 shift registers 503 would be employed. The information in the buffer memory 501 is shifted 40 lines at a time in parallel into the shift registers. The shift registers 503 are interfaced with the heads and amplifiers of a conventional tape recorder 504. A conventional timer or counter 505, which is normally contained in the buffer memory 501 is connected to the tape recorder 504, and the shift registers 503 and provides proper timing signals.

The contents of the shift registers 503 is transferred to and recorded serially on the tope and the tape recorder 504 will provide the proper timing signals. These timing signals will also be recorded on one track of the tape which will serve as the sync track. In addition, the counter 505 serves as a time monitor and after transference of all of the information from the shift registers 503 to the tape, the counter will provide a logical signal. After all of the information in the shift registers 503 have been recorded on the tape, the counter 505 will cause the buffer memory 501 to transfer the next group of words to the shift registers 503 simultaneously with the recording of the logic pulse. The recording of the logic pulse requires a sufficiently long period of time to enable the buffer memory 501 to transfer the next group of words to the shift registers 503.

After each word in the buffer memory has been read, it is recycled to the address from which it was removed and reentered thereat through the operation of the address and control mechanism.

Where analog tape recording is being performed on the analog tape recorder, it is desirable to use a level shifter and FM electronics to assign a DC voltage to each of the three states, namely the logic "one" and "zero" pulses. The DC voltage will cause a frequency analogous to each of the three states to be recorded on the tape. In the digital recording, it is desirable to couple each shift register 503 to a pair of write amplifiers to generate the one hundred percent redundancy.

It can be seen that the system for recording the desired form of information of the tape is simple and quite efficient. Most of the large components for performing the recording, such as the computer, buffer memory and tape recorders is generally owned or possessed by organizations having data processing operations.

It should be understood that change sand modifications can be made in the form, construction, arrangement and combinations of parts presently described and pointed out without departing from the nature and principle of my invention.

Having thus described my invention, what I desire to claim and secure by Letters Patent is:

1. A unitary station indicia verification apparatus for comparing an identification indicia with a stored list of indicia, said apparatus comprising:
   a. means for introducing an identification indicia for comparison into said apparatus,
   b. a shift register having a plurality of bistable storage elements for receiving the identification indicia introduced into said apparatus,
   c. storage means for retaining a list of stored indicia with which said identification indicia is to be compared,
   d. storage reading means for reading the stored indicia,
   e. recirculating means for recirculating the introduced identification indicia in said shift register,
   f. means for introducing clock pulses to compare the identification indicia with the stored indicia external to the recirculating means on a time basis,
   g. means for serially comparing the identification indicia during recirculation in said shift register with the stored indicia on a bit-by-bit basis,
   h. and advisory signal means operatively connected to said last named means for being actuated and render an advisory signal when the desired comparison or lack thereof occurs.

2. The indicia verification apparatus of claim 1 further characterized in that each identification indicia constitutes a word and includes a plurality of separate and distinct characters, each of said characters being generated into a set of plural bits upon introduction into said apparatus and each of the plural bits of a set being simultaneously introduced into said shift register, the stored indicia being in the form of a plurality of separate and distinct bits and being compared with the generated bits from the identification indicia.

3. The indicia verification apparatus of claim 2 further characterized in that said shift register comprises an entrance register capable of accommodating a set of bits generated by one indicia character, and a recirculating register capable of accommodating all of the bits generated by introduction of each of the characters of a word in said apparatus.

4. The indicia verification apparatus of claim 3 further characterized in that each set of indicia bits introduced into said entrance register is shifted into said recirculating register prior to introduction of the next set of plural bits into said entrance register.

5. The indicia verification apparatus of claim 4 further characterized in that recirculation and comparison is not initiated until all of the separate characters representing an identification word has been introduced into said shift register.

6. The indicia verification apparatus of claim 4 further characterized in that a bit counter is operatively associated with said shift register for counting the plural bits representing each character.

7. The indicia verification apparatus of claim 6 further characterized in that the apparatus comprises means for generating a series of sequentially available shift pulses, and means operatively connecting said last named means to said bit counter for shifting each set of bits further into said recirculating register by means of sequentially allocated shift pulses and thereby allow space in said shift register for the next set of bits.

8. The indicia verification apparatus of claim 2 further characterized in that said storage means contains stored logic data and that the storage reading means reads the logic data along with the stored indicia.

9. A unitary station indicia identification apparatus for comparing an identification indicia in the form of a word having a plurality of separate characters with a stored list of indicia in the form of binary-type bits, said apparatus comprising:

a. input means for introducing each of the characters into said apparatus and converting each of the characters into a set of binary-type indicia bits,
b. a recirculating shift register having a number of bistable elements sufficient to accommodate the indicia bits representative of all of the characters in a word,
c. means for introducing each set of binary-type indicia bits representative of the word of said identification indicia into said recirculating register,
d. a binary-type bit counter,
e. shift pulse generating means operatively connected to said bit counter and said shift register for further shifting each of the sets introduced into the shift register a set at a time, said bit counter allocating a number of shift pulses equivalent to the number of indicia binary-type bits in each set,
f. data storage means having a magnetic member with stored binary-type bits and logic pulses,
g. reading means for detecting and reading the stored binary-type bits,
h. motive means for causing relative movement between said magnetic member and reading means to enable the reading of the stored binary-type bits and logic pulses in said data storage means,
i. means for initiating recirculation and serial comparison of the binary-type bits representative of said identification indicia during recirculation with the stored binary-type bits representative of said stored list of indicia on a bit-by-bit basis, said comparison being performed external to said shift register,
j. memory means for maintaining a memory of equality of any of the binary type bits representative of the identification indicia with the stored binary type bits during the serial comparison thereof,
k. coincidence indication means operatively connected to said memory means and actuable upon the coincidence or lack thereof of all of the stored binary-type bits with the binary-type bits representative of said identification indicia,
l. and advisory signal means operatively connected to said last-named means and energizable thereby upon detection of a valid or invalid identification indicia.

10. The indicia identification apparatus of claim 9 further characterized in that an entrance register is operatively associated with the recirculating register and the input means, said entrance register having a sufficient number of bistable elements to accommodate all of the binary-type bits of a set and all of the bits of a set being introduced in parallel into said entrance register prior to introduction into said recirculating register.

11. The indicia identification apparatus of claim 10 further characterized in that recirculation control means is operatively associated with said recirculating register to prevent recirculation during introduction of all of the sets into said recirculating register.

12. The indicia identification apparatus of claim 10 further characterized in that load gate means is operatively interposed between said entrance register and said recirculating register to control the shifting of the bits in said entrance register into said recirculating register.

13. The indicia identification apparatus of claim 9 further characterized in that an AND gate matrix is operatively connected to said input means and said recirculating shift register, all of the bits of a set being introduced in parallel into said AND gate matrix prior to introduction into said recirculating register.

14. The indicia identification apparatus of claim 13 further characterized in that an AND gate is provided for each bit and that all of the AND gates are connected to an OR gate.

15. The indicia identification apparatus of claim 10 further characterized in that capacitors are interposed in the means for introducing the indicia bits into the entrance register.

16. The indicia identification apparatus of claim 9 further characterized in that said bit counter comprises means for selectively metering a number of count pulses equivalent to the number of bits in a set and enabling said shift pulse generating means to shift just the number of bits of a set into the first equivalent number of flip-flops in said recirculating register.

17. The indicia identification apparatus of claim 9 further characterized in that said comparison means comprises a half adder and a memory flip-flop to keep track of all coincidence between indicia bits and stored bits.

18. The indicia identification apparatus of claim 9 further characterized in that a latching circuit is operatively connected to said coincidence indication means and said advisory signal means for holding said advisory signal means in the energized state upon actuation of said coincidence indication means until resetting of the apparatus.

19. The indicia identification apparatus of claim 9 further characterized in that means for generating sync pulses is provided and is operatively connected to said reading means and to said coincidence indication means to provide comparison at sync pulse time.

20. The indicia identification apparatus of claim 19 further characterized in that the means for generating sync pulses comprises a track on said magnetic member containing sync pulses, and a sync reading head to read said sync pulses upon relative movement between said sync reading head and magnetic member.

21. The indicia identification apparatus of claim 9 further characterized in that a data head forms part of said reading means and is engageable against said magnetic member and reads the stored bits and logic pulses thereon when relative movement is created, and filtering means operatively connected to said data head for separating the logic pulses from the stored bits to provide comparison of the stored bits and indicia bits at logic pulse time.

22. The indicia identification apparatus of claim 9 further characterized in that a parity circuit is operatively connected to said shift register for detecting the generation or loss of a bit in said shift register, and error signal means operatively connected to said parity circuit for advising of such generation or loss of a bit.

23. The indicia identification apparatus of claim 9 further characterized in that magnetic member is a multitrack member and the stored bits is recorded thereon in FSK form.

24. The indicia identification apparatus of claim 9 further characterized in that said member is a multitrack member and recorded with nonreturn to zero mark data and that said data head includes a pair of individual reading elements located on two adjacent tracks of said magnetic member, each of two adjacent tracks of said member having identical data recorded thereon, and means connected to each of said elements for detecting a coincidence of reading on each of the two adjacent tracks having identical data recorded thereon.

25. The indicia identification apparatus of claim 9 further characterized in that said magnetic member also includes logic pulses which are interposed between each of the words recorded on said tape, and that comparison will occur between two logic pulses.

26. A credit card verification apparatus for comparing an identification number on a credit card with a stored list of invalid credit card numbers, said apparatus comprising:

a. an outer housing, b. means for introducing the characters forming the credit card number into said apparatus and converting each of the characters into a 4-bit binary decimal code, c. a shift register having an entrance register capable of receiving four bits representing a character of the identification number and a recirculating register capable of holding all of the bits representing all of the characters of said identification number, d. a 4-bit counter capable of counting four pulses, e. a shift gate operatively connected to said entrance register, f. a drum operatively mounted in said housing and being rotatable therein, g. means on said drum for removably receiving a multitrack magnetic tape having stored lists of invalid credit card numbers recorded thereon in the form of stored binary coded decimal bits, said multitrack tape also having logic pulse signals stored thereon and being placed between a number of binary coded decimal bits equivalent to the number of bits generated by a decimal indicia character, said tape having a track containing synchronizing pulses, h. a head carriage mechanism operatively mounted in said outer housing, said head carriage mechanism comprising:

1. base means,
2. a head supporting frame operatively mounted on said base means,
3. a data head operatively mounted on said head supporting frame,
4. a synchronizing head operatively mounted on said base means,
5. a trackway formed in said base means for shiftably supporting said head supporting frame in a direction so that said data head moves sequentially past each of the tracks on the multitrack type, said trackway also being designed to enable said head supporting frame to shift toward said drum to a reading position and away from said drum to a remote position,
6. ratchet-type means on said base means for intermittently shifting said head supporting means along said base means so that said data head is sequentially positioned on each next adjacent track of said tape,
7. a stepping solenoid operatively mounted on said base means for actuating said ratchet-type means,
8. means operatively associated with said stepping solenoid for enabling shifting movement of said head supporting frame to a reading position and to a remote position,
9. resetting means on said base means for disengaging said ratchet-type means to shift said head supporting frame to its initial position after said data head has read each of the tracks on said multitrack tape, i. clock pulse means operatively connected to said synchronizing head for generation of a series of said clock pulses from said synchronizing pulses, j. a head position gate operatively connected to said clock pulse means and being operatively connected to said stepping solenoid for enabling actuation thereof, k. a shift pulse gate operatively connected to said head position gate and to said shift gate and 4-bit counter for generating shift pulses and enabling said four bit counter to pass four shift pulses through said shift gate to shift each 4-binary decimal code bits representing each character into said recirculating register, l. camming means operatively associated with said drum causing generating of a cam pulse with each revolution of said drum, m. a track shift mechanism operatively connected to said head position gate and causing actuation of said head carriage mechanism to shift said data head to the next adjacent track on said tape after each complete revolution of said drum, n. a filter connected to said data head and being capable of sorting logic pulses from said data bits, o. a bit comparison device operatively connected to said filter, p. load gates operatively interposed between said entrance register and said recirculating register and preventing shifting action in said shift register during loading of four bits in said entrance register, q. recirculating control gates operatively connected to the output of said recirculating register and preventing recirculation of the information contained therein during the information entrance process, r. means connecting said recirculating control gates to said comparison mechanism to compare the data bits read from said tape with the recirculating bits from said recirculating register, s. a memory device connected to the output of said comparison device for keeping track of all comparisons and lack thereof, t. means actuable upon the coincidence or lack thereof of all elements of said identification number with the stored list of invalid credit card numbers, u. and advisory signal means energizable by said last named means to advise of the presence of an invalid credit card.

27. The credit card verification apparatus of claim 26 further characterized in that a read error circuit is connected to said filter and is capable of determining an error in the reading of data from said tape, and error advisory signal means operatively connected to said read error circuit and being energizable upon detection of an error in the reading process.

28. The credit card verification apparatus of claim 26 further characterized in that said filter has a "one" level output, a "zero" level output and a logic pulse output, and that said read error circuit comprises an exclusive OR gate connected to the "one" and "zero" level outputs of said filter and an AND gate connected to the output of said OR gate.

29. The credit card verification apparatus of claim 27 further characterized in that the means for introducing the elements of the credit card member into said apparatus comprises a keyboard mounted on said apparatus with a diode matrix connected to the keyboard for converting each of the elements into a 4-bit binary decimal code.

30. The credit card verification apparatus of claim 26 further characterized in that the means for introducing the elements of the credit card number into said apparatus comprises an automatic card reader which includes:

a. a card receiving tray capable of carrying said credit card into said housing, b. motive means for moving said tray, c. a light source capable of directing light on a bar code appearing on said credit card, d. light sensitive photocells for detecting the amount of light reflected from photocells, e. circuit means for converting the reflected light from the bar code into a 5-bit code representative of the elements designated by said bar code, f. a conversion matrix operatively connected to said circuit means for converting the 5-bit code into a 4-bit code, g. and a settling time circuit for insuring proper reading of said bar code.

31. The credit card verification apparatus of claim 30 further characterized in that a parity circuit is operatively connected to said shift register for detecting the generation or loss of a bit in said shift register, and error signal means operatively connected to said parity circuit for advising of such generation or loss of a bit.

32. The credit card verification apparatus of claim 31 further characterized in that said parity circuit comprises:

a. a first counter for counting the number of pulses passing into said recirculating register from said entrance register,
b. a second counter for counting the number of pulses recirculated in said recirculating register,
c. An exclusive OR circuit for counting the number of pulses jammed into said entrance register,
d. and detection means operatively connected to each of said first and second counters and said exclusive OR gate and to said error signal means.

33. The credit card verification apparatus of claim 26 further characterized in that said tape is recorded with nonreturn to zero mark data and that said data head includes a pair of individual reading elements located on two adjacent tracks, each of two adjacent tracks of said tape having identical data recorded thereon, and means connected to each of said elements for detecting a coincidence of reading on each of the two adjacent tracks having identical data recorded thereon.

34. The process of comparing identification indicia with a stored list of indicia in a unitary station, said process comprising:

a. generating binary decimal bits which are representative of the identification indicia,
b. reading the stored list of indicia,
c. detecting synchronous pulses simultaneously with the reading of the stored list of indicia,
d. circulating the binary decimal bits,
e. serially comparing the binary decimal bits with the stored indicia on a bit-by-bit basis on a synchronous time basis and during circulation of the binary decimal bits,
f. and generating a responsive action when a comparison or lack thereof is detected.

35. The process of comparing identification indicia with a stored list of indicia in the form of stored list indicia bits on a multitrack magnetic element in an apparatus including a shift register capable of causing recirculation, and a data head for reading indicia and a sync head for reading sync pulses, said process comprising:

a. generating a set of binary decimal bits for each element in the identification indicia,
b. inserting each set of generated bits into the shift register,
c. generating a number of shift pulses which are equivalent to the number of bits in each set for shifting said set into said shift register and allowing room for the next succeeding set of bits,
d. inhibiting recirculating during the entrance of each of the sets into the shift register,
e. shifting the data head into contact with a track of the magnetic element causing reading of the stored list of indicia bits,
f. recirculating the generated bits in said shift register after all of the sets representing each of the elements in said identification indicia have been entered into said shift register,
g. adding the generated data bits to the stored indicia bits and serially comparing said bits on a bit-by-bit basis,
h. reading said sync pulses to make said comparison on a sync time basis,
i. and providing an advisory signal after reading all of the data on said element when a comparison or lack thereof is detected.

36. The process of claim 35 further characterized in that a head shift pulse is generated after each track has been read by said data head, and shifting said head to the next track on said element by means of said head shift pulse.

37. The process of claim 36 further characterized in that the process includes the determination of the last track on said element read by said data head, and stopping the process after the last track has been entirely read.

38. The process of claim 35 further characterized in that logic pulses are recorded with said stored list of indicia bits and are read with the indicia bits by the data head.

39. A unitary station apparatus for comparing an unknown indicia with a stored list of indicia, said apparatus comprising:

a. a shift register for receiving the unknown indicia in the form of a plurality of digital-type bits in binary format introduced into said apparatus,
b. storage means operatively associated with said apparatus for retaining the stored list of indicia in the form of digital-type bits in binary format,
c. recirculating means operatively associated with said shift register for recirculating the digital-type bits of the unknown indicia in said shift register,
d. means operatively connected to said recirculating means for serially comparing the digital-type bits of said known indicia bit by bit with the digital-type bits of said stored list of indicia during recirculation of the digital-type bits of the unknown indicia in said shift register on a pulse timed basis, said comparison being performed external to said shift register, and
e. means operatively connected to said last named means and being responsive to comparison or lack thereof.

40. A unitary station apparatus for comparing an unknown indicia with a stored list of indicia, said apparatus comprising:

a. drum-type retaining means in said apparatus for retaining a magnetic tapelike element,
b. a magnetic tapelike element removably disposed on said retaining means so that the terminal ends of said tapelike element are nonoverlapping for any substantial distance, said tapelike element containing the stored list of indicia in the form of a plurality of digital-type bits in binary format,
d. means in said apparatus for converting the unknown indicia to a plurality of digital-type bits in binary format,
e. means in said apparatus for reading the digital type bits representing said unknown indicia from said tape and serially comparing said unknown indicia digital-type bits with the digital-type bits representing said stored indicia on a bit-by-bit basis, and
f. and means operatively connected to said last-named means and being responsive to comparison or lack thereof.

41. A unitary station indicia comparison apparatus for comparing an unknown indicia with a stored indicia, said apparatus comprising a logic pulse source, a shift register having a plurality of flip-flops divided into an entrance register and a recirculating register and where indicia to be compared is introduced into said entrance register in the form of binary bits and is passed into said recirculating register for recirculation therethrough, storage means for retaining a stored list of indicia, a parity circuit including a first counter connected to the input of the entrance register and counting the number of pulses recirculated in said recirculating register, a second counter connected to the first counter and to each of the flip-flops in said entrance register and recirculating register for counting the number of pulses shifted into said recirculating register from said entrance register, an exclusive OR circuit connected to the inputs of each of the flip-flops in said entrance register for examining the pulses entered into said entrance register, said OR circuit being operatively connected to the input of said second counter, means for connecting said first counter to said logic pulse source to provide counting at logic pulse time, a comparison gate being connected to said first and second counters and to said logic pulse source for detecting gain or loss of a pulse in said shift register at logic pulse time, means operatively associated with said shift register for comparing said known indicia bit by bit with said stored list of indicia on a pulse time basis, and means operatively connected to said last named means and being responsive to comparison or lack thereof.

42. The indicia comparison apparatus of claim 41 further characterized in that a one-shot is interposed in the means connecting the first counter to said logic pulse source for delaying the resetting action of said first counter until a comparison has been made in the comparison gate.

43. The indicia comparison apparatus of claim 41 further characterized in that the exclusive OR circuit comprises an exclusive OR gate connected to the input of each of two flip-flops in said entrance register and a final exclusive OR gate connected to the outputs of each of the aforementioned exclusive OR gates.

44. An apparatus for reading a digital-type code formed of digital informational bits recorded on an opaque code bearing element such as a credit card or the like and where the digital type code represents identification indicia, said apparatus comprising:

a. base means,
b. a retaining member for positionally and removably retaining said code bearing element,
c. means for shifting said retaining member between a first end position and a second end position, said first end position representing a location where said code bearing element can be disposed on said retaining member,
d. radiation emitting means for directing radiation on the code as it passes relative to said radiation emitting means during movement thereof,
e. radiation sensitive resistance means positionally located to receive the radiation reflected from said code bearing element and being capable of distinguishing between the digital informational bits of said digital code and the remaining surface of the code bearing element,
f. said radiation sensitive means distinguishing between selected logic levels of the various digital informational bits of said digital code,
g. means for generating electrical signals responsive to the logic levels distinguished from the radiation sensed by said radiation sensitive means, and
h. a settling time circuit to prevent said last named means from generating said electrical signals until all digital bits in any row of bits transverse to the movement of said code bearing element have passed said radiation sensitive means to thereby obviate skew problems.

45. The apparatus of claim 44 further characterized in that said radiation emitting means is a visible light source and said radiation sensitive resistance means are a series of light sensitive photocells, the resistance characteristics of which change responsive to the light incident thereon.

46. The apparatus of claim 44 further characterized in that an imprinting member is located in the path of movement of the retaining member for imprinting the information on the code bearing element onto a second element disposed in facewise engagement with said code bearing element.